United States Patent
Kim

(10) Patent No.: US 12,192,882 B2
(45) Date of Patent: Jan. 7, 2025

(54) METHOD FOR TRANSCEIVING SYSTEM INFORMATION IN WIRELESS COMMUNICATION SYSTEM SUPPORTING CARRIER AGGREGATION, AND APPARATUS THEREFOR

(71) Applicant: LG ELECTRONICS INC., Seoul (KR)

(72) Inventor: Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 275 days.

(21) Appl. No.: 17/758,911

(22) PCT Filed: Jan. 31, 2020

(86) PCT No.: PCT/KR2020/001482
§ 371 (c)(1),
(2) Date: Jul. 15, 2022

(87) PCT Pub. No.: WO2021/153826
PCT Pub. Date: Aug. 5, 2021

(65) Prior Publication Data
US 2023/0053250 A1    Feb. 16, 2023

(51) Int. Cl.
*H04W 48/08*    (2009.01)
*H04B 7/0408*    (2017.01)
*H04W 76/10*    (2018.01)

(52) U.S. Cl.
CPC .......... *H04W 48/08* (2013.01); *H04B 7/0408* (2013.01); *H04W 76/10* (2018.02)

(58) Field of Classification Search
CPC ..... H04W 48/08; H04W 76/10; H04W 48/12; H04W 76/20; H04W 76/15; H04B 7/0408; H04B 7/0639; H04J 11/00; H04L 5/00
See application file for complete search history.

(56) References Cited

U.S. PATENT DOCUMENTS

2019/0037634 A1* 1/2019 Kadiri ................... H04W 76/18
2019/0306739 A1* 10/2019 Kim .................. H04W 72/0453
(Continued)

FOREIGN PATENT DOCUMENTS

WO    2013-052805    4/2013

OTHER PUBLICATIONS

PCT International Application No. PCT/KR2020/001482, International Search Report dated Oct. 21, 2020, 4 pages.
(Continued)

*Primary Examiner* — Abdullahi Ahmed
(74) *Attorney, Agent, or Firm* — LEE, HONG, DEGERMAN, KANG & WAIMEY

(57) ABSTRACT

A method for receiving system information (SI) by a terminal in a wireless communication system supporting carrier aggregation (CA), according to one embodiment of the present specification, comprises: transmitting an RRC connection request message to a base station; receiving an RRC connection setup message from the base station; transmitting an RRC connection setup complete message to the base station; receiving an RRC reconfiguration message related to configuration of a secondary cell (SCell) from a primary cell (pCell) of the base station; and receiving a synchronization signal (SS) from the SCell based on the RRC reconfiguration message.

14 Claims, 18 Drawing Sheets

(56) References Cited

U.S. PATENT DOCUMENTS

| | | | | |
|---|---|---|---|---|
| 2019/0356438 A1* | 11/2019 | Lee | ................ | H04B 7/0695 |
| 2021/0195437 A1* | 6/2021 | Wei | ................ | H04W 72/1263 |
| 2022/0256489 A1* | 8/2022 | Tian | ................ | H04W 16/28 |
| 2022/0352969 A1* | 11/2022 | Yang | ................ | H04W 72/23 |
| 2023/0239895 A1* | 7/2023 | Yang | ................ | H04W 72/046 |
| | | | | 370/329 |
| 2024/0171997 A1* | 5/2024 | Du | ................ | H04B 7/0695 |

OTHER PUBLICATIONS

Zte Corporation et al., "On delay reduction of SCell Activation," R2-1904250, 3GPP TSG-RAN WG2 Meeting #105bis, Apr. 2019, 3 pages.

Ericsson, "Enhancements to initial access procedure," R1-1904336, 3GPP TSG-RAN WG1 Meeting #96b, Apr. 2019, 13 pages.

* cited by examiner

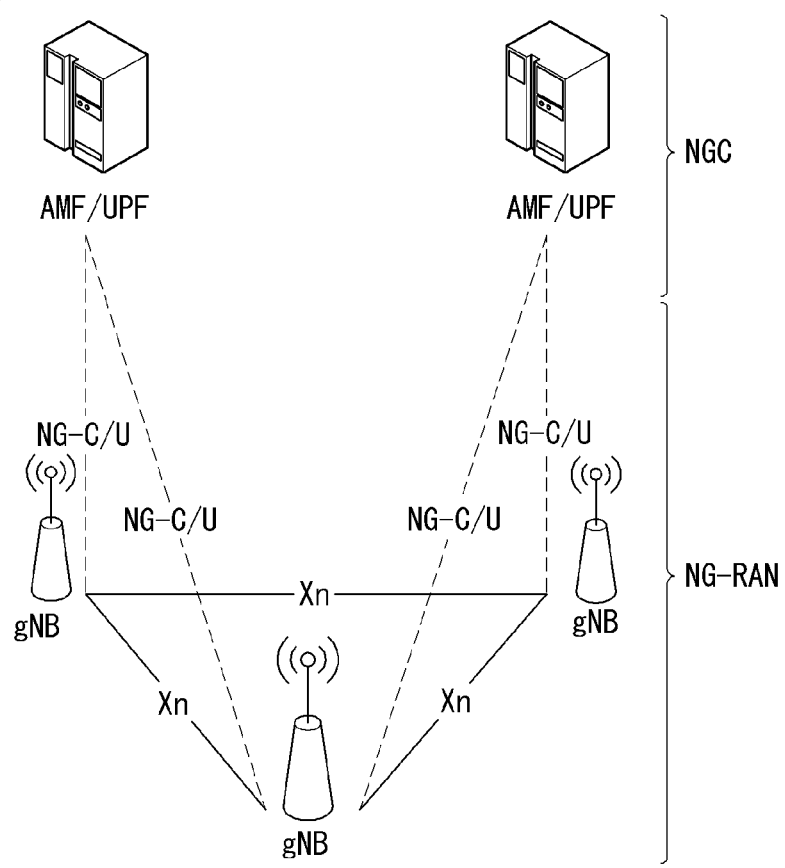
[FIG. 1]

[FIG. 2]
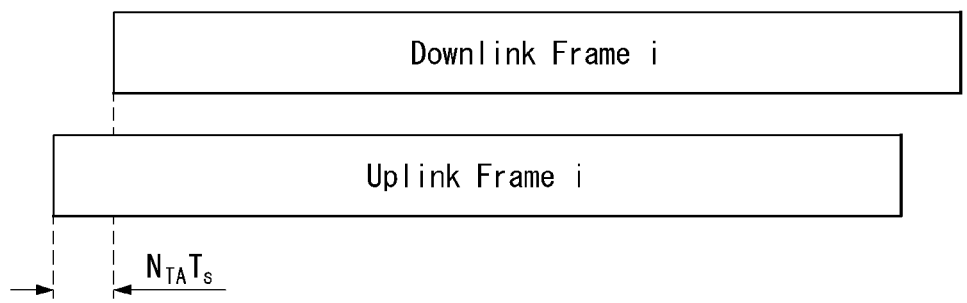

[FIG. 3]
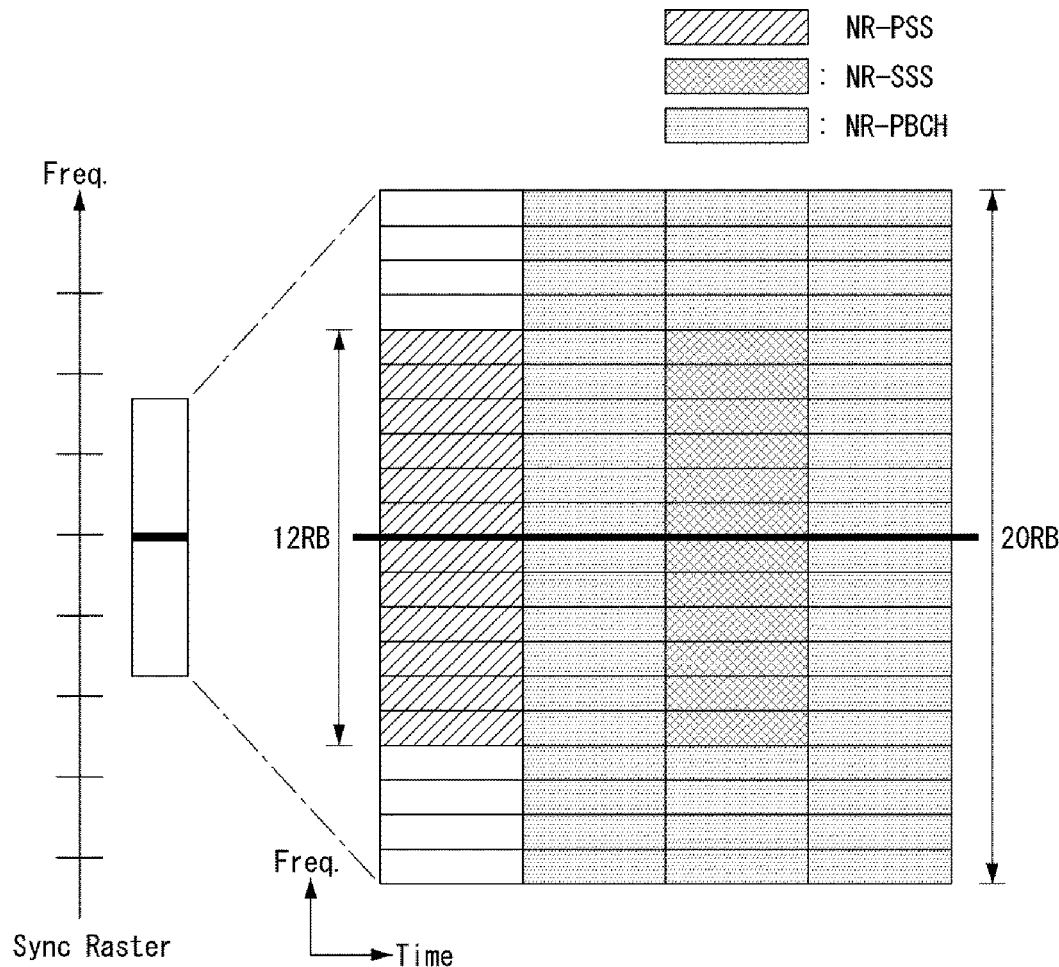

[FIG. 4]
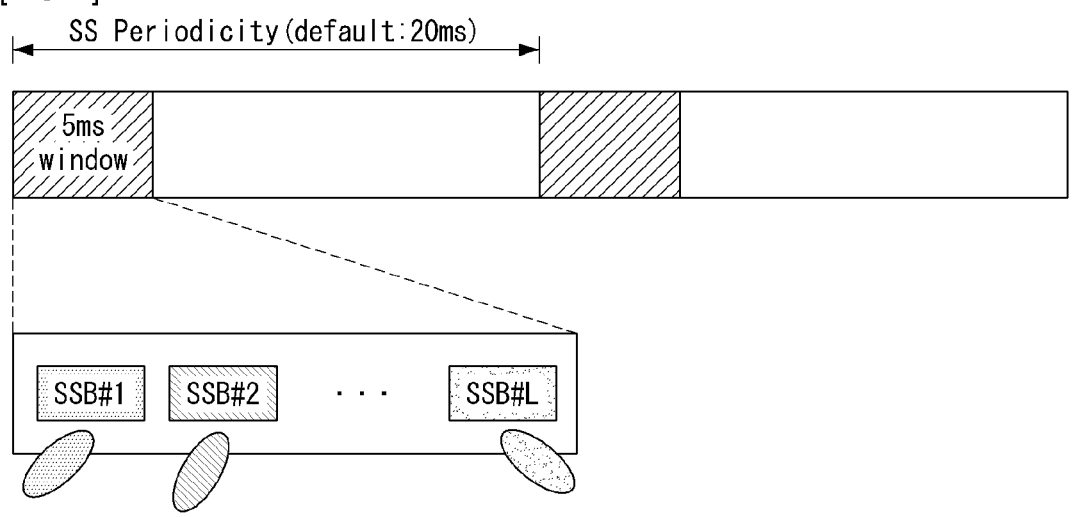

[FIG. 5]
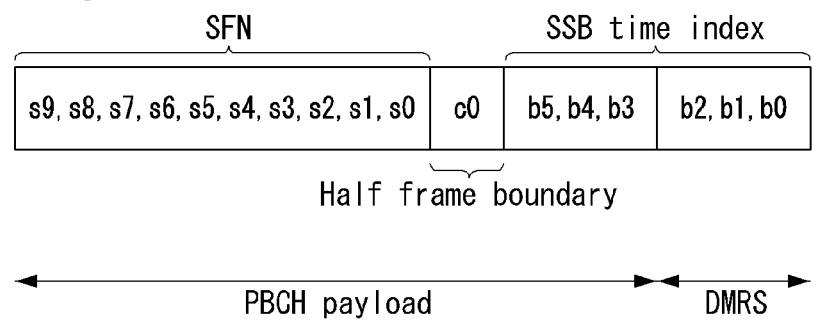

[FIG. 6]
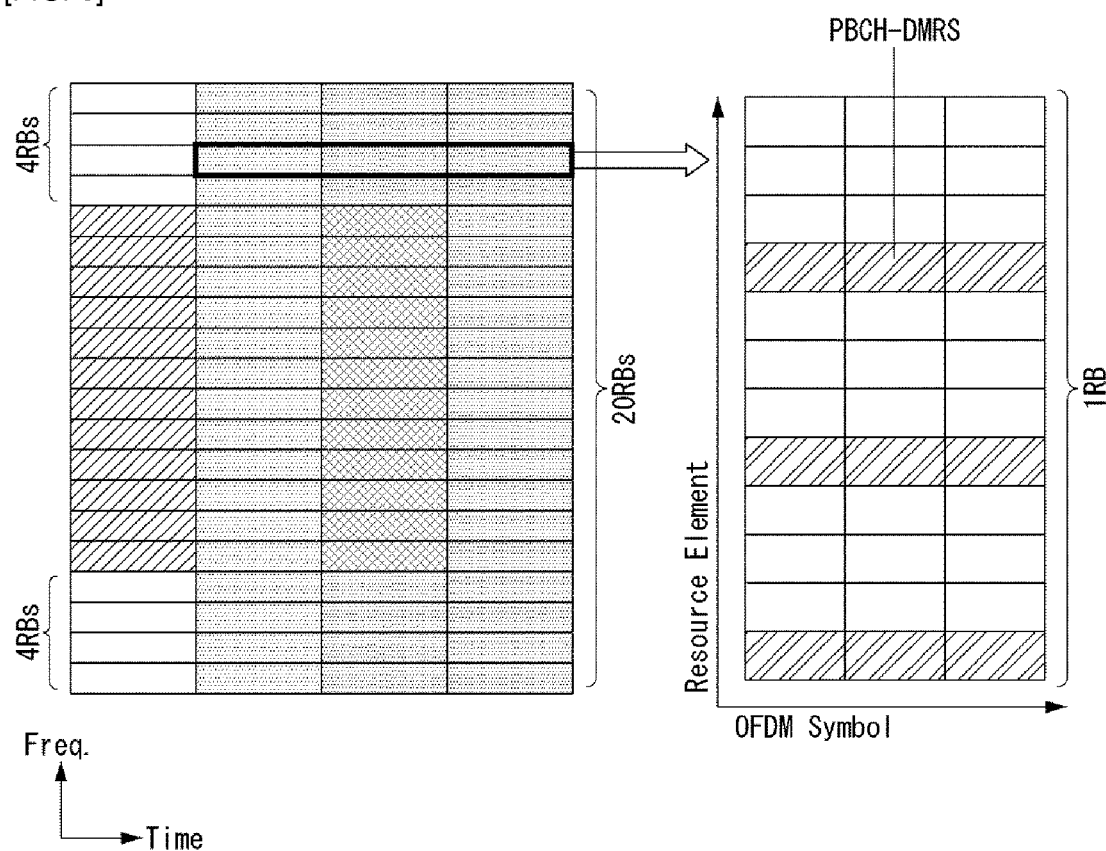

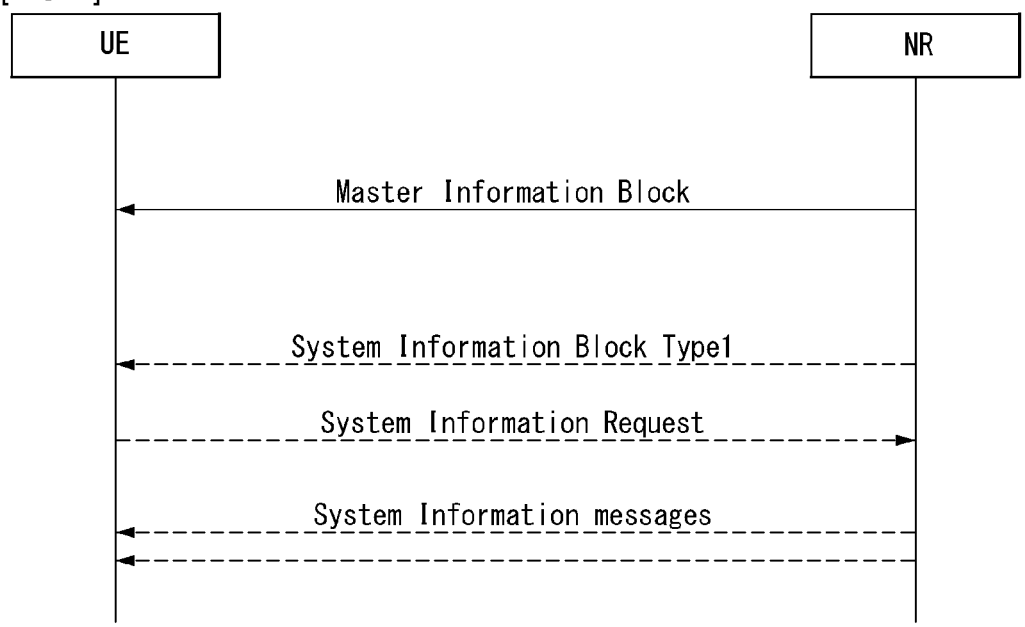

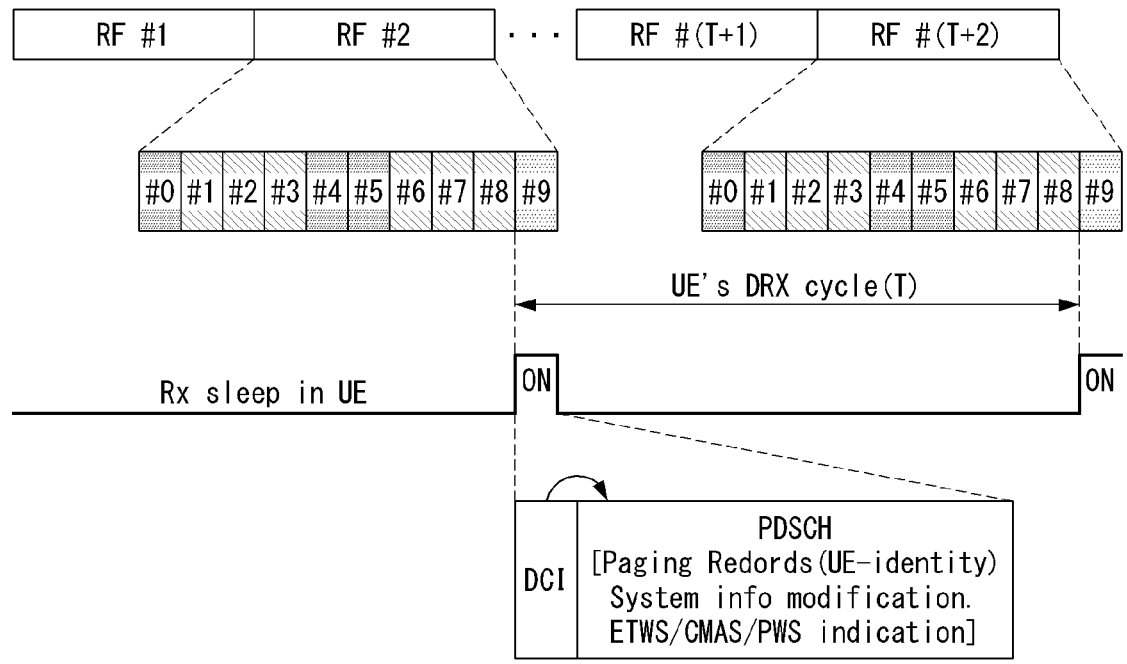
[FIG. 8]

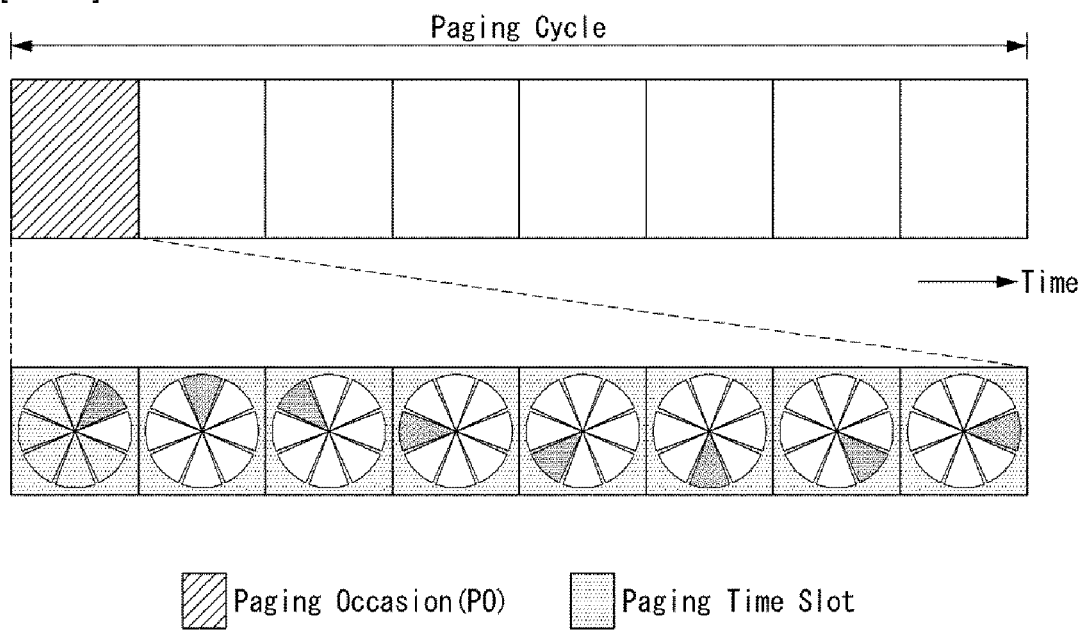
[FIG. 9]

[FIG. 10]
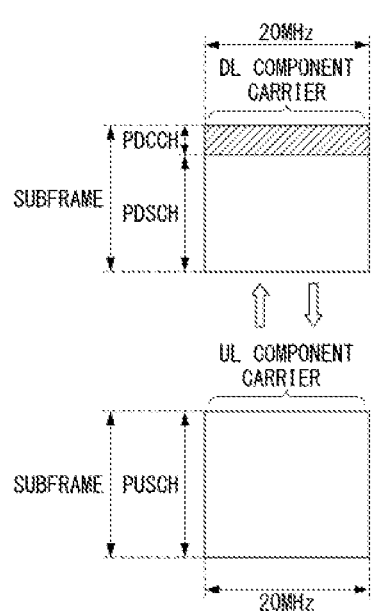
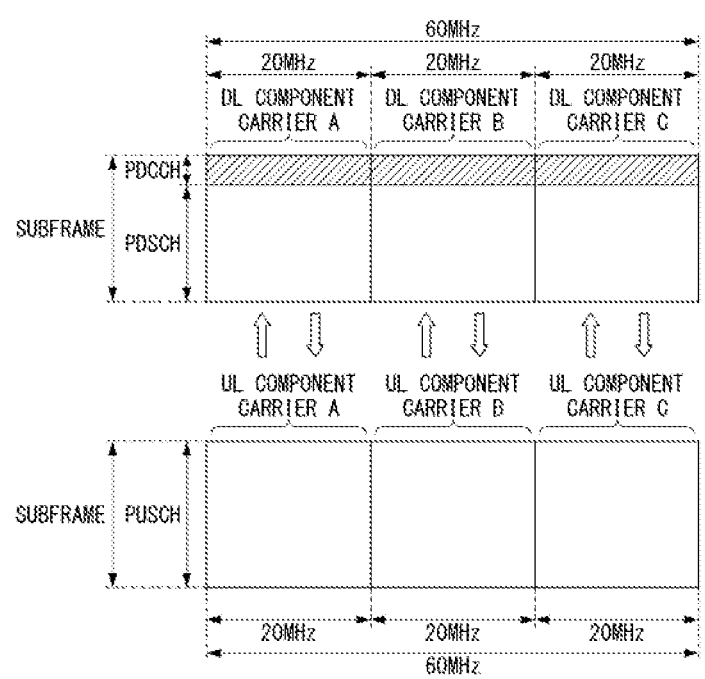
(a) SINGLE CC
(b) MULTIPLE CC

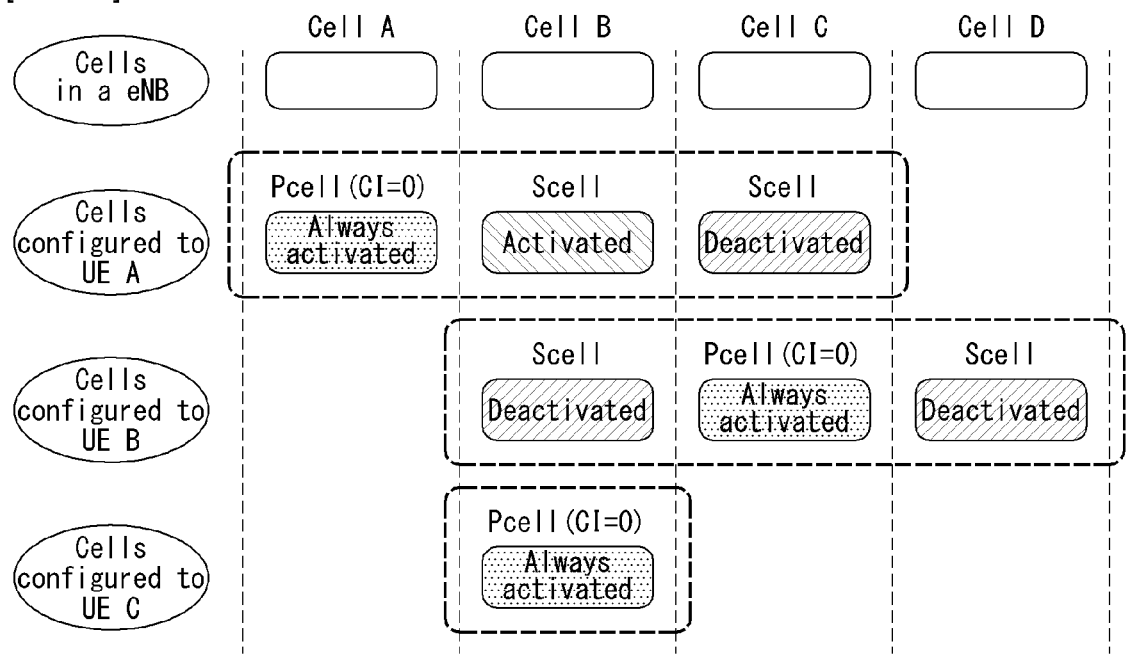
[FIG. 11]

[FIG. 12]
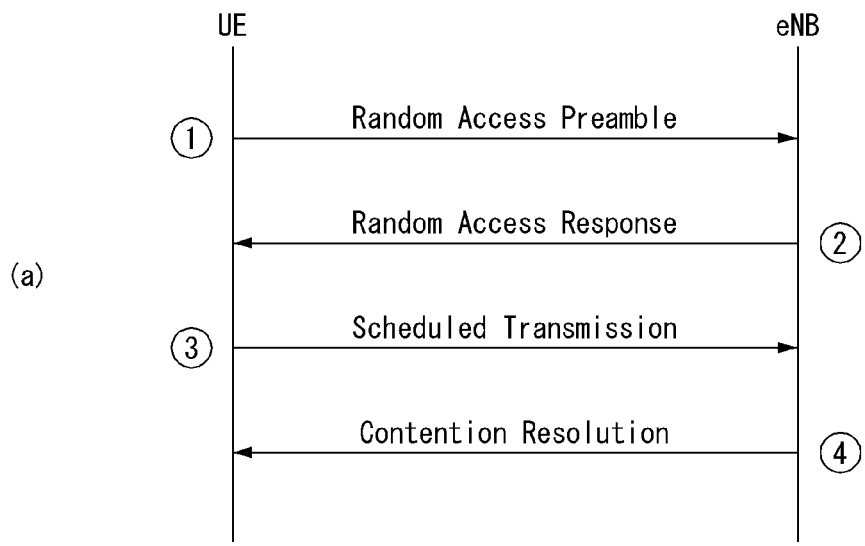
(a)
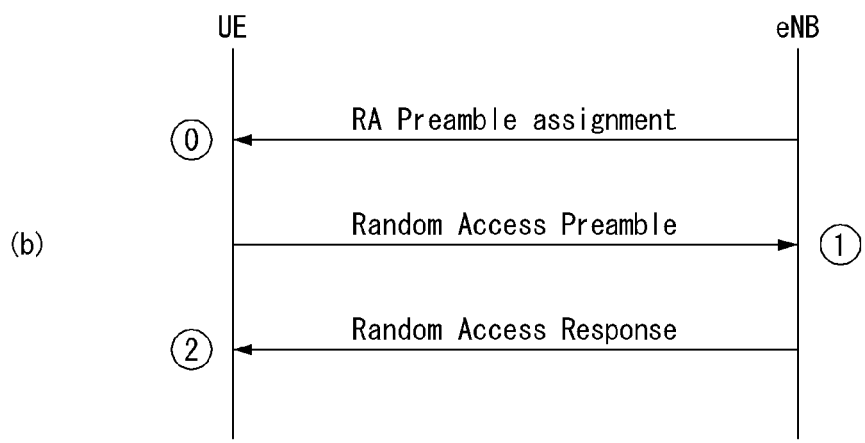
(b)

[FIG. 13]
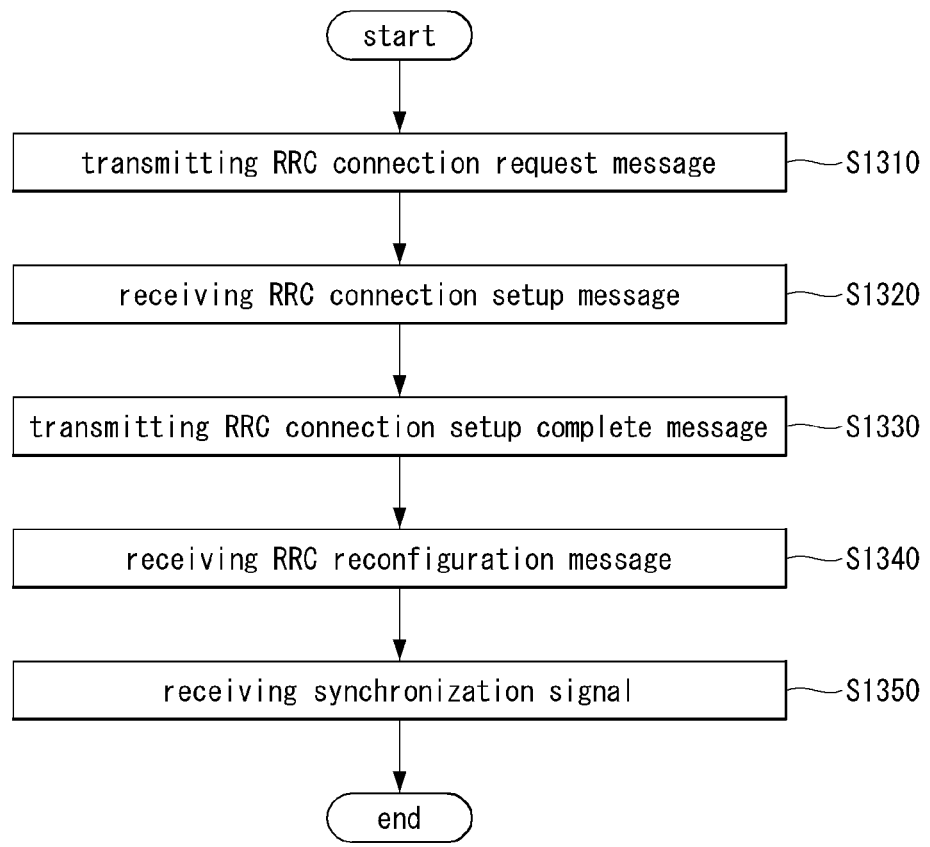

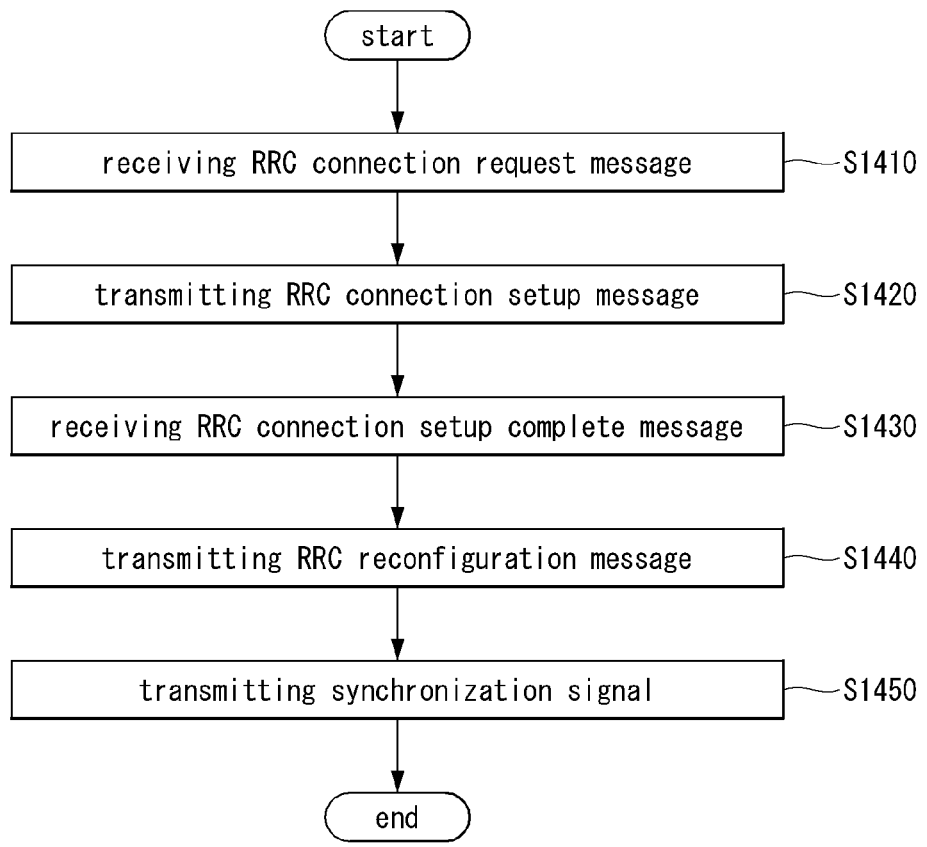
[FIG. 14]

[FIG. 15]
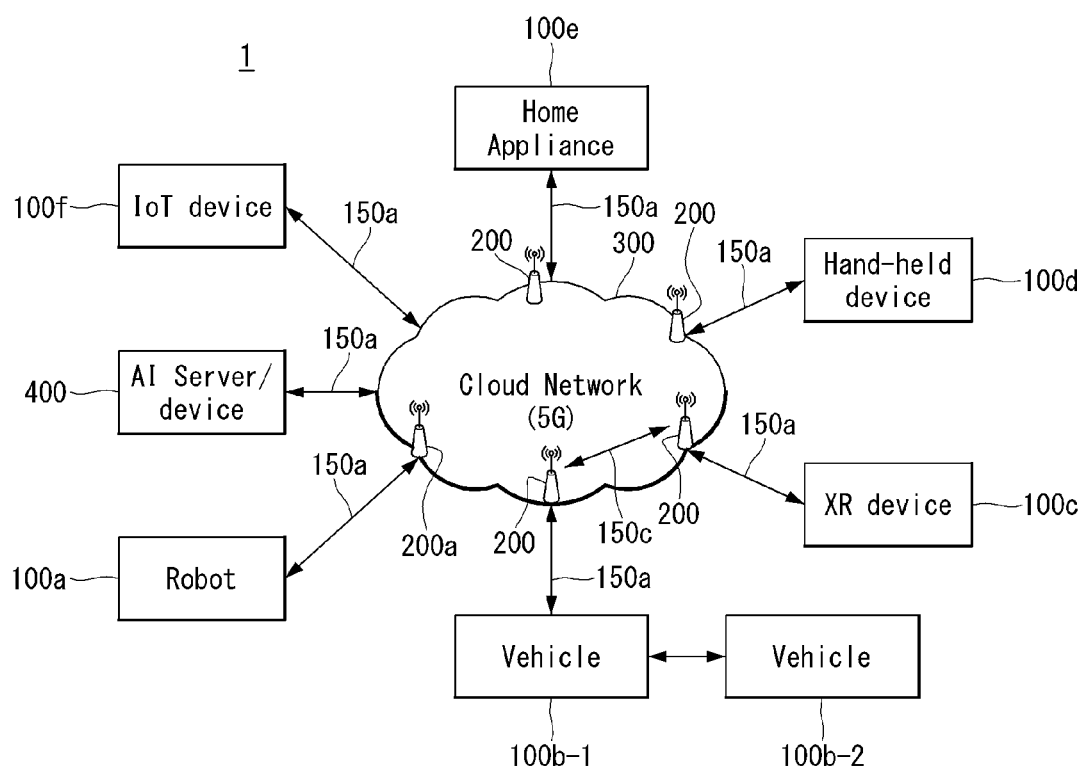

[FIG. 16]
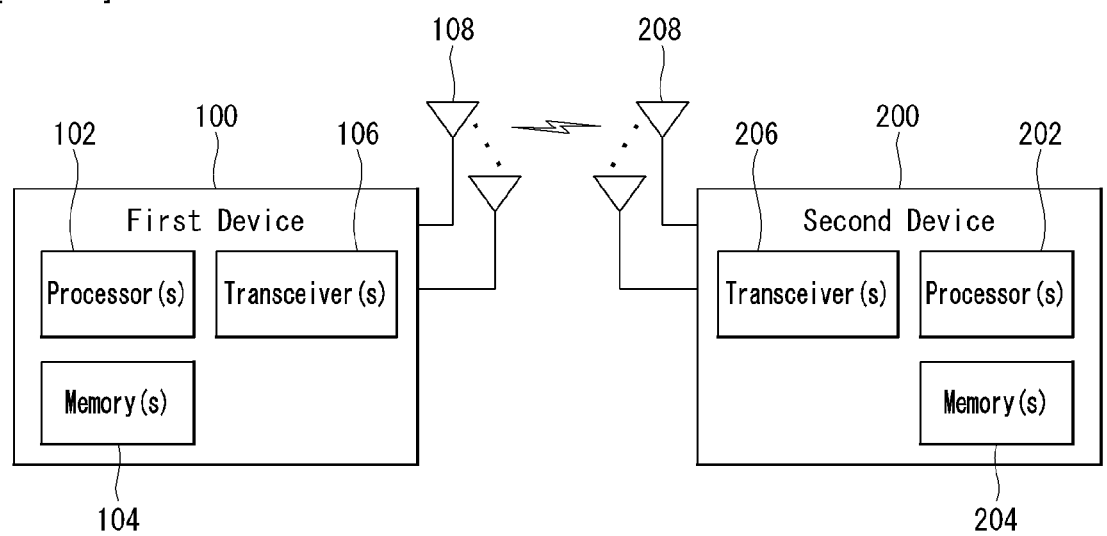

[FIG. 17]
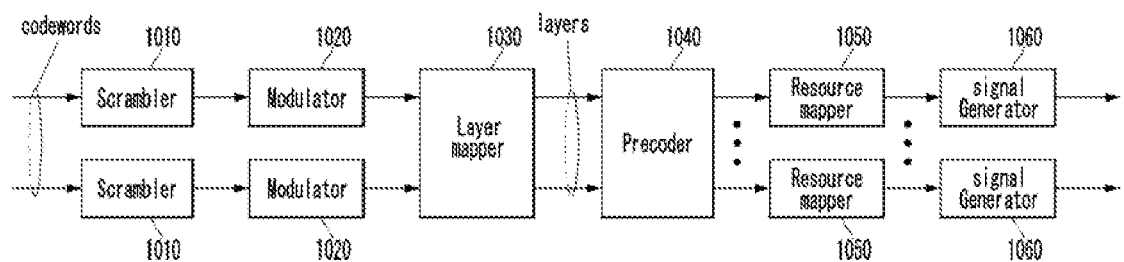
[FIG. 18]
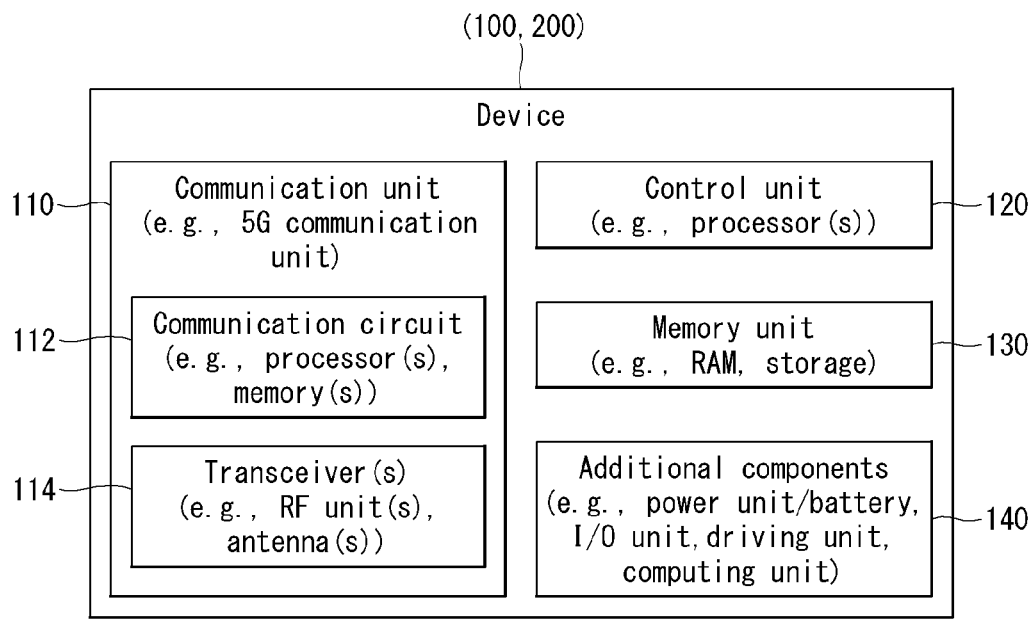

[FIG. 19]
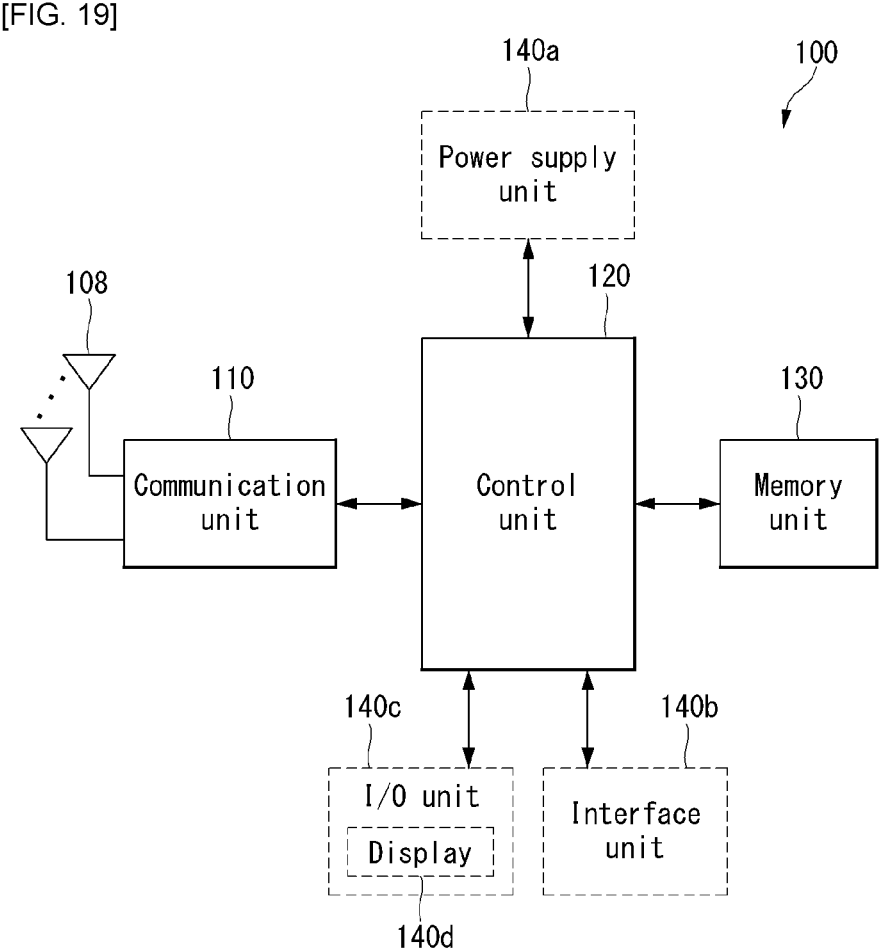

METHOD FOR TRANSCEIVING SYSTEM INFORMATION IN WIRELESS COMMUNICATION SYSTEM SUPPORTING CARRIER AGGREGATION, AND APPARATUS THEREFOR

CROSS-REFERENCE TO RELATED APPLICATIONS

This application is the National Stage filing under 35 U.S.C. 371 of International Application No. PCT/KR2020/001482, filed on Jan. 31, 2020, the contents of which is hereby incorporated by reference herein in its entirety.

TECHNICAL FIELD

The present disclosure relates to a method of transmitting and receiving system information in a wireless communication system supporting carrier aggregation, and an apparatus thereof.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like

DISCLOSURE

Technical Problem

The present disclosure provides enhancing resource utilization in transmitting system information in a high frequency band.

More specifically, a master information block (MIB) is transmitted through a physical broadcast channel (PBCH). The physical broadcast channel (PBCH) beam-swept and transmitted so as to be transmitted to all regions of a cell. In the case of the high frequency band, as a beam width is narrowed, beam sweeping should be conducted at more numbers of times so as to cover all regions of the cell. As a result, a time resource required for transmitting the physical broadcast channel (PBCH) increases. When there are not a lot of users in the cell, it is inefficient to transmit system information through such a scheme. The problem occurs similarly even in the case of a paging message transmitted through the beam sweeping.

Therefore, an object of the present disclosure is to solve the problem.

Objects of the disclosure are not limited to the foregoing, and other unmentioned objects would be apparent to one of ordinary skill in the art from the following description.

Technical Solution

According to an embodiment of the present disclosure, a method of receiving, by a user equipment (UE), system information (SI) in a wireless communication system supporting carrier aggregation (CA) includes: transmitting an RRC connection request message to a base station (BS); receiving an RRC connection setup message from the BS; transmitting an RRC connection setup complete message to the BS; receiving, from a primary cell (PCell) of the BS, an RRC reconfiguration message related to a configuration of a secondary cell (SCell); and receiving, from the secondary cell (SCell), a synchronization signal (SS) based on the RRC reconfiguration message.

The RRC reconfiguration message includes at least one of a master information block (MIB) of the secondary cell (SCell) or a time point when the synchronization signal is transmitted, and an SS block in which the synchronization signal is transmitted is based on beam information of the primary cell (PCell) and the time point when the synchronization signal is transmitted.

The SS block is one of a plurality of SS blocks based on the beam information of the primary cell (PCell), and the beam information of the primary cell (PCell) includes at least one of a channel state information reference signal resource ID (CSI-RS resource ID), a precoding matrix index (PMI), or an SS block index (SSB index).

The secondary cell (SCell) operates in a specific frequency band.

A beam width of the secondary cell (SCell) based on the specific frequency band may be smaller than a beam width of the primary cell (PCell).

The time point when the synchronization signal is transmitted may be expressed as a specific bitmap.

A number of bits of the specific bitmap may be based on a total number of slots included in a radio frame.

The time point when the synchronization signal is transmitted may be expressed as an index representing a specific slot in the radio frame.

A number of bits of the index may be based on a number of the plurality of SS blocks.

The number of bits of the index may be x*ceil$(\log_2 N_{tot\_slot})$, and here, x may represent the number of the plurality of SS blocks, ceil( ) may represent an operator of performing a rounding operation of a decimal point or less, and $N_{tot\_sync\_slot}$ may represent the number of slots in which the synchronization signal is transmitted in the radio frame.

A portion of the master information block (MIB) may be included in the RRC reconfiguration message and a remainder of the master information block (MIB) may be included in the synchronization signal.

The synchronization signal may include a primary synchronization signal (PSS) and a secondary synchronization signal (SSS), and the remainder of the master information block (MIB) may be included in the secondary synchronization signal (SSS).

The method may further include receiving a paging message from the primary cell (PCell) based on an RRC idle mode. The paging message may include information representing the secondary cell (SCell).

According to another embodiment of the present disclosure, a UE receiving system information (SI) in a wireless communication system supporting carrier aggregation (CA) includes: one or more transceivers; one or more processors; and one or more memories operatively connectable to the one or more processors, and storing instructions of performing operations when the reception of the system information is executed by the one or more processors.

The operations include: transmitting an RRC connection request message to a base station (BS); receiving an RRC connection setup message from the BS; transmitting an RRC connection setup complete message to the BS; receiving, from a primary cell (PCell) of the BS, an RRC reconfiguration message related to a configuration of a secondary cell (SCell); and receiving, from the secondary cell (SCell), a synchronization signal (SS) based on the RRC reconfiguration message.

The RRC reconfiguration message may include at least one of a master information block (MIB) of the secondary cell (SCell) or a time point when the synchronization signal is transmitted, and an SS block in which the synchronization signal is transmitted may be based on beam information of the primary cell (PCell) and the time point when the synchronization signal is transmitted.

According to yet another embodiment of the present disclosure, an apparatus includes one or more memories and one or more processors functionally connected to the one or more memories.

The one or more processors are configured to control the apparatus to transmit an RRC connection request message to a base station (BS); receive an RRC connection setup message from the BS; transmit an RRC connection setup complete message to the BS; receive, from a primary cell (PCell) of the BS, an RRC reconfiguration message related to a configuration of a secondary cell (SCell); and receive, from the secondary cell (SCell), a synchronization signal (SS) based on the RRC reconfiguration message.

The RRC reconfiguration message may include at least one of a master information block (MIB) of the secondary cell (SCell) or a time point when the synchronization signal is transmitted, and an SS block in which the synchronization signal is transmitted may be based on beam information of the primary cell (PCell) and the time point when the synchronization signal is transmitted.

According to still yet another embodiment of the present disclosure, a method of transmitting, by a base station (BS), system information (SI) in a wireless communication system supporting carrier aggregation (CA) includes: receiving an RRC connection request message from a user equipment (UE); transmitting an RRC connection setup message to the UE; receiving an RRC connection setup complete message from the UE; transmitting, to the UE, an RRC reconfiguration message related to a configuration of a secondary cell (SCell) through a primary cell (PCell); and transmitting a synchronization signal (SS) based on the RRC reconfiguration message through the secondary cell (SCell).

The RRC reconfiguration message may include at least one of a master information block (MIB) of the secondary cell (SCell) or a time point when the synchronization signal is transmitted, and an SS block in which the synchronization signal is transmitted may be based on beam information of the primary cell (PCell) and the time point when the synchronization signal is transmitted.

According to stilly yet another embodiment of the present disclosure, a BS transmitting system information (SI) in a wireless communication system supporting carrier aggregation (CA) includes: one or more transceivers; one or more processors; and one or more memories operatively connectable to the one or more processors, and storing instructions of performing operations when the transmission of the system information is executed by the one or more processors.

The operations include: receiving an RRC connection request message from a user equipment (UE); transmitting an RRC connection setup message to the UE; receiving an RRC connection setup complete message from the UE; transmitting, to the UE, an RRC reconfiguration message related to a configuration of a secondary cell (SCell) through a primary cell (PCell); and transmitting a synchronization signal (SS) based on the RRC reconfiguration message through the secondary cell (SCell).

The RRC reconfiguration message may include at least one of a master information block (MIB) of the secondary cell (SCell) or a time point when the synchronization signal is transmitted, and an SS block in which the synchronization signal is transmitted may be based on beam information of the primary cell (PCell) and the time point when the synchronization signal is transmitted.

According to still yet another embodiment of the present disclosure, one or more non-transitory computer-readable media store one or more instructions.

One or more instructions executable by one or more processors is configured to control a UE to transmit an RRC connection request message to a base station (BS); receive an RRC connection setup message from the BS; transmit an RRC connection setup complete message to the BS; receive, from a primary cell (PCell) of the BS, an RRC reconfiguration message related to a configuration of a secondary cell (SCell); and receive, from the secondary cell (SCell), a synchronization signal (SS) based on the RRC reconfiguration message.

The RRC reconfiguration message may include at least one of a master information block (MIB) of the secondary cell (SCell) or a time point when the synchronization signal is transmitted, and an SS block in which the synchronization signal is transmitted may be based on beam information of the primary cell (PCell) and the time point when the synchronization signal is transmitted.

Advantageous Effect

According to an embodiment of the present disclosure, a master information block (MIB) of a secondary cell (SCell) is included in an RRC reconfiguration message related to a configuration of the secondary cell (SCell) transmitted by a primary cell (PCell). Accordingly, system information (SI) of the secondary cell (SCell) is not transmitted through a physical broadcast channel (PBCH), so resource utilization is enhanced at the time of transmitting the system information. In particular, when the secondary cell (SCell) operates in a terahertz (THz) frequency band, the corresponding effect can be more prominent.

Furthermore, according to an embodiment of the present disclosure, an SS block in which a synchronization signal of the secondary cell (SCell) is transmitted can be based on a time point when beam information of the primary cell (PCell) and the synchronization signal of the secondary cell (SCell) are transmitted. Accordingly, even when the master information block (MIB) of the secondary cell (SCell) is not transmitted through the physical broadcast channel (PBCH), a beamforming direction of the secondary cell (SCell) can be effectively indicated.

Furthermore, according to an embodiment of the present disclosure, a UE in an RRC idle mode receives a paging message from the primary cell (PCell). The paging message includes information representing the secondary cell (SCell). Accordingly, resources and consumed power of the UE required for receiving paging information of the secondary cell (SCell) can be reduced.

Effects of the disclosure are not limited to the foregoing, and other unmentioned effects would be apparent to one of ordinary skill in the art from the following description.

DESCRIPTION OF DRAWINGS

FIG. 1 illustrates an example of an overall structure of a NR system to which a method proposed by the present specification is applicable.

FIG. 2 illustrates a relation between an uplink frame and a downlink frame in a wireless communication system to which a method proposed by the present specification is applicable.

FIG. 3 is a view for describing resource allocation related to transmission of a synchronization signal block (SSB) to which a method proposed by the present disclosure is applicable.

FIG. 4 illustrates transmission of the synchronization signal block (SSB) to which a method proposed by the present disclosure is applicable.

FIG. 5 illustrates that a UE acquires information on DL time synchronization to which a method proposed by the present disclosure is applicable.

FIG. 6 is a view illustrating a time/frequency domain structure of a physical broadcast channel (PBCH) to which a method proposed by the present disclosure is applicable.

FIG. 7 illustrates a process of acquiring system information (SI) to which a method proposed by the present disclosure is applicable.

FIG. 8 is a view for describing a mechanism of transmission of a paging to which a method proposed by the present disclosure is applicable.

FIG. 9 is a view for describing beam sweeping based on a paging mechanism to which a method proposed by the present disclosure is applicable.

FIG. 10 illustrates one example of a component carrier and carrier aggregation in a wireless communication system to which the present disclosure may be applied.

FIG. 11 illustrates an example where a system supporting carrier aggregation distinguishes cells.

FIG. 12 is a flowchart for describing a contention/contention-free based random access procedure to which a method proposed by the present disclosure is applicable.

FIG. 13 is a flowchart for describing a method of receiving, by a UE, system information in a wireless communication system supporting carrier aggregation according to an embodiment of the present disclosure.

FIG. 14 is a flowchart for describing a method of receiving, by a BS, system information in a wireless communication system supporting carrier aggregation according to an embodiment of the present disclosure.

FIG. 15 illustrates a communication system 1 applied to the present disclosure.

FIG. 16 illustrates a wireless device applicable to the present disclosure.

FIG. 17 illustrates a signal processing circuit applied to the present disclosure.

FIG. 18 illustrates another example of a wireless device applied to the present disclosure.

FIG. 19 illustrates a portable device applied to the present disclosure.

MODE FOR DISCLOSURE

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the disclosure, and the suffix itself is not intended to give any special meaning or function. It will be noted that a detailed description of known arts will be omitted if it is determined that the detailed description of the known arts may obscure the embodiments of the disclosure. The accompanying drawings are used to help easily understand various technical features and it should be understood that embodiments presented herein are not limited by the accompanying drawings. As such, the disclosure should be construed to extend to any alterations, equivalents and substitutes in addition to those which are particularly set out in the accompanying drawings.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

DEFINITION OF TERMS eLTE eNB: An eLTE eNB is an evolution of an eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

System General

FIG. 1 illustrates an example of an overall structure of a new radio (NR) system to which a method proposed by the present specification is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$, where $\Delta f_{max}=480 \cdot 10^3$, and $N_f=4096$. Downlink and uplink transmissions are organized into radio frames with a duration of $T_f=(\Delta f_{max} N_f/100) \cdot T_s=10$ ms. The radio frame consists of ten subframes each having a section of $T_{sf}=(\Delta f_{max} N_f/1000) \cdot T_s=1$ ms. In this case, there may be a set of frames in the uplink and a set of frames in the downlink.

FIG. 2 illustrates a relation between a UL frame and a DL frame in a wireless communication system to which a method proposed by the disclosure is applicable.

As illustrated in FIG. 2, a UL frame number i for transmission from a user equipment (UE) shall start $T_{TA}=N_{TA}T_s$ before the start of a corresponding downlink frame at the corresponding UE.

Regarding the numerology μ, slots are numbered in increasing order of," $n_s^\mu \in \{0, \ldots, N_{subframe}^{slots,\mu}-1\}$ within a subframe, and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology in use and configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 represents the number of OFDM symbols $N_{symb}^{slot}$ per slot in a normal CP, the number of slot $N_{slot}^{frame,\mu}$ slot per radio frame and the number of slot subframe, $N_{slot}^{subframe,\mu}$ slot per subframe, and Table 3 represents the number of OFDM symbols in an extended CP, the number of slot per radio frame and the number of slot per subframe.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |

TABLE 2-continued

| | Slot configuration | | | | | |
|---|---|---|---|---|---|---|
| | 0 | | | 1 | | |
| $\mu$ | $N_{symb}^{\mu}$ | $N_{frame}^{slots\mu}$ | $N_{subframe}^{slots,\mu}$ | $N_{symb}^{\mu}$ | $N_{frame}^{slots\mu}$ | $N_{subframe}^{slots,\mu}$ |
| 3 | 14 | 80 | 8 | — | — | — |
| 4 | 14 | 160 | 16 | — | — | — |
| 5 | 14 | 2220 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots\mu}$ | $N_{subframe}^{slots,\mu}$ | $N_{symb}^{\mu}$ | $N_{frame}^{slots\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 2220 | 32 | — | — | — |

NR Physical Resource

Regarding physical resources in the NR system, an antenna port, a resource grid, a resource element, a resource block, a carrier part, etc. May be considered.

Hereinafter, the above physical resources possible to be considered in the NR system will be described in more detail.

First, regarding an antenna port, the antenna port is defined such that a channel over which a symbol on one antenna port is transmitted may be inferred from another channel over which a symbol on the same antenna port is transmitted. When large-scale properties of a channel received over which a symbol on one antenna port may be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Initial Access in NR System

An NR synchronization signal is based on CP-OFDM. NR defines at least two types of synchronization signals (NR-PSS and NR-SSS). The NR-PSS is defined for initial symbol boundary synchronization for at least an NR cell. The NR-SSS is defined to detect an NR cell ID or at least a part of the NR cell. The number of NR cell IDs is targeted at approximately 1000. NR-SSS detection is based on a fixed time/frequency relationship with an NR-PSS resource at least regardless of a duplex mode and a beam operation type within a given frequency range and CP overhead.

In the NR-PSS/SSS, a normal CP is supported at least. A raster of the NR synchronization signal may be different for each frequency range. For a frequency range in which the NR supports a wider carrier bandwidth and operates in a wider frequency spectrum (e.g., 6 GHz or more), the NR synchronization signal raster may be larger than a 100 kHz raster of the LTE.

When a synchronization signal bandwidth is the same as a minimum system bandwidth for a given frequency band searched by the UE, a synchronization signal frequency raster it eh same as a channel raster. In the case of a carrier that supports an initial access, a minimum carrier bandwidth of the NR may be 5 MHz or 10 MHz in a frequency range of up to 6 GHz and is different according to the frequency band. In a frequency range of 6 GHz to 52.6 GHz, the minimum carrier bandwidth of the NR may be 40 MHz or 80 MHz and is different according to the frequency band.

At least one NR physical broadcast channel (NR-PBCH) is defined. NR-PBCH decoding is based on a fixed relationship with NR-PSS and/or NR-SSS resource positions, at least within a given frequency range and CP overhead, regardless of a duplex mode and a beam operation type. The NR-PBCH is a non-scheduled broadcast channel which carries at least some of minimum system information having a predefined fixed payload size and periodicity in a specification according to the carrier frequency range.

In single-beam and multi-beam scenarios, time division multiplexing of the NR-PSS, the NR-SSS, and the NR-BPCH is supported. The NR-PSS, the NR-SSS, and/or the NR-PBCH may be transmitted in an SS block. For a given frequency band, the synchronization signal block (SSB) corresponds to N OFDM symbols based on a default subcarrier spacing, and N is a constant. A signal multiplexing structure is fixed to the specification. The UE should be able to at least identify a radio frame number from an OFDM symbol index, a slot index in a radio frame, and a radio frame number from the SS block.

FIG. 3 is a view for describing resource allocation related to transmission of a synchronization signal block (SSB) to which a method proposed by the present disclosure is applicable.

The SS/PBCH block is used for transmitting the synchronization signal and the PBCH. Referring to FIG. 3, 4 OFDM symbols and 20 resource blocks (RBs) are allocated to the SS/PBCH block. In particular, the PBCH is transmitted in 3 OFDM symbols. For the number of REs for the transmission of the PBCH, 20 RB=240 REs in second and fourth OFDM symbols of the SS/PBCHblock, and 8RB=96 REs in a third OFDM symbol.

FIG. 4 illustrates transmission of the synchronization signal block (SSB) to which a method proposed by the present disclosure is applicable.

SSB (Synchronization Signal Block) Transmission and Related Operation

The UE may perform cell search, system information acquisition, beam alignment for initial connection, DL measurement, etc. based on the SSB. The SSB is used interchangeably with the synchronization signal/physical broadcast channel (SS/PBCH) block. The SSB is constituted by the PSS, the SSS, and the PBCH. The SSB is constituted by four consecutive OFDM symbols and the PSS, the PBCH, the SSS/PBCH, and the PBCH are transmitted for each OFDM symbol. Each of the PSS and the SSS may be constituted by one OFDM symbol and 127 subcarriers and the PBCH is constituted by 3 OFDM symbols and 576 subcarriers. Polar coding and quadrature phase shift keying (QPSK) are applied to the PBCH. The PBCH is constituted by a data RE and a demodulation reference signal (DMRS) RE for each OFDM symbol. Three DMRS REs exist for each RB, and three data REs exist between DMRS REs.

Cell Search

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as shown in Table 4 below.

TABLE 4

| | Type of Signals | Operations |
|---|---|---|
| 1st step | PSS | SS/PBCH block (SSB) symbol timing acquisition<br>Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF)<br>Remaining Minimum System Information (RMSI)<br>Control resource set (CORESET)/Search space configuration |
| 5th Step | PDCCH and PDSCH | Cell access information<br>RACH configuration |

There may be 336 cell ID groups, and each cell ID group may have three cell IDs. A total of 1008 cell IDs may exist and defined according to Equation 1.

$$N_{ID}^{cell}=3N_{ID}^{(1)}+N_{ID}^{(2)}$$ [Equation 1]

where, $N_{ID}^{(1)} \in \{0, 1, \ldots, 335\}$ and, $N_{ID}^{(2)} \in \{0,1,2\}$ where NcellID represents a cell ID (e.g., PCID). N(1)ID represents a cell ID group, which is provided/acquired through the SSS. N(2)ID represents a cell ID in a cell ID group, which is provided/acquired through the PSS.

A PSS sequence dPSS(n) may be defined to satisfy Equation 2.

$$d_{PSS}(n) = 1 - 2x(m)$$ [Equation 2]

$$m = \left(n + 43N_{ID}^{(2)}\right) \bmod 127$$

$$0 \leq n < 127$$

where x(i+7)=(x(i+4)+x(i))mod 2 and
[x(6) x(5) x(4) x(3) x(2) x(1) x(0)]=[1 1 1 0 1 1 0]

An SSS sequence dSSS(n) may be defined to satisfy Equation 3.

$$d_{sss}(n) = [1 - 2x_0((n + m_0) \bmod 127)][$$ [Equation 3]

$$1 - 2x_1((n + m_1) \bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \leq n < 127$$

where $x_1(i+7)=(x_1(i+1)+x_1(i))\bmod 2$ $[x_0(6) x_0(5) x_0(4) x_0(3) x_0(2) x_0(1) x_0(0)] = [0\ 0\ 0\ 0\ 0\ 0\ 1]$, $[x_1(6) x_1(5) x_1(4) x_1(3) x_1(2) x_1(1) x_1(0)] = [0\ 0\ 0\ 0\ 0\ 0\ 1]$.

The SSB is transmitted periodically with an SSB periodicity. A default SSB periodicity that a UE assumes during initial cell search is defined as 20 ms. After cell access, the SSB periodicity may be set to one of {5 ms, 10 ms, 20 ms, 40 ms, 80 ms, 160 ms} by a network (e.g., base station). An SSB burst set is configured at the start of an SSB period. The SSB burst set includes a 5-ms time window (i.e., a half-frame), and the SSB may be transmitted up to L times within the SS burst set. The maximum transmission number L of the SSB may be given as follows according to the frequency band of a carrier. One slot includes up to two SSBs.

For frequency range up to 3 GHZ, L=4
For frequency range from 3 GHz to 6 GHZ, L=8
For frequency range from 6 GHz to 52.6 GHZ, L=64

The time positions of SSB candidates in the SS burst set may be defined as follows according to SCSs. The time positions of the SSB candidates are indexed from 0 to L−1 (SSB indexes) in a time order in the SSB burst set (i.e., half-frame).

Case A-15 kHz SCS: The starting symbols of the SSB candidates are given as {2, 8}+14*n. If a carrier frequency is 3 GHz or below, n=0, 1. If the carrier frequency ranges from 3 GHz to 6 GHZ, n=0, 1, 2, 3.

Case B-30 KHz SCS: The starting symbols of the SSB candidates are given as {4, 8, 16, 20}+28*n. If the carrier frequency is 3 GHz or below, n=0. If the carrier frequency ranges from 3 GHz to 6 GHZ, n=0, 1.

Case C-30 kHz SCS: The starting symbols of the SSB candidates are given as {2, 8}+14*n. If the carrier frequency is 3 GHz or below, n=0, 1. If the carrier frequency ranges from 3 GHz to 6 GHZ, n=0, 1, 2, 3.

Case D-120 KHz SCS: The starting symbols of the SSB candidates are given as {4, 8, 16, 20}+28*n. If the carrier frequency is above 6 GHZ, n=0, 1, 2, 3, 5, 6, 7, 8, 10, 11, 12, 13, 15, 16, 17, 18.

Case E-240 KHz SCS: The starting symbols of the SSB candidates are given as {8, 12, 16, 20, 32, 36, 40, 44}+56*n. If the carrier frequency is above 6 GHZ, n=0, 1, 2, 3, 5, 6, 7, 8.

FIG. 5 illustrates that a UE acquires information on DL time synchronization to which a method proposed by the present disclosure is applicable.

The UE may acquire DL synchronization by detecting an SSB. The UE may identify the structure of an SSB burst set based on the index of the detected SSB, and thus detect a symbol/slot/half-frame boundary. The number of a frame/half-frame to which the detected SSB belongs may be identified by SFN information and half-frame indication information.

Specifically, the UE may acquire 10-bit SFN (System Frame Number) information s0 to s9 from a PBCH. 6 bits of the 10-bit SFN information is acquired from a master information block (MIB), and the remaining 4 bits are acquired from a PBCH transport block (TB).

Subsequently, the UE may acquire 1-bit half-frame indication information co. If a carrier frequency is 3GH or below, the half-frame indication information may be signaled implicitly by a PBCH DMRS. The PBCH DMRS indicates 3-bit information by using one of 8 PBCH DMRS sequences. Therefore, if L=4, the remaining one bit except for two bits indicating an SSB index in the 3-bit information which may be indicated by 8 PBCH DMRS sequences may be used for half-frame indication.

Finally, the UE may acquire an SSB index based on the DMRS sequence and the PBCH payload. SSB candidates are indexed from 0 to L−1 in a time order within an SSB burst set (i.e., half-frame). If L=8 or 64, three least significant bits (LSBs) b0 to b2 of the SSB index may be indicated by 8 different PBCH DMRS sequences. If L=64, three most significant bits (MSBs) b3 to b5 of the SSB index is indicated by the PBCH. If L=2, two LSBs b0 and b1 of an SSB index may be indicated by 4 different PBCH DMRS sequences. If L=4, the remaining one bit b2 except for two bits indicating an SSB index in 3-bit information which may be indicated by 8 PBCH DMRS sequences may be used for half-frame indication.

FIG. 6 is a view illustrating a time/frequency domain structure of a physical broadcast channel (PBCH) to which a method proposed by the present disclosure is applicable.

Common control information includes a master information block (MIB), system information such as a system information block (SIB), and paging information.

In the NR standard, the MIB is transmitted through the PBCH and the SIB is transmitted through the PDSCH. In the case of the PDSCH for transmitting the SIB, an SI-RNTI mask transmits PDSCH control information by using the PDCCH, and this is detected by all UEs.

The PBCH is transmitted through an SS/PBCH block constituted by the SS and the PBCH.

Referring to FIG. 6, the SS/PBCH block is constituted by 4 OFDM symbols and 20 resource blocks (RBs). In particular, the PBCH is transmitted through resource elements (REs) which belong to 3 OFDM symbols. Specifically, the number of resource elements at the time of transmitting the PBCH is 240 REs (=20 RBs) in the second and fourth OFDM symbols and 96 REs (=8 RBs) in the third OFDM symbols.

The SS/PBCH block is transmitted through beamforming for coverage securing. Since there is no information on beamforming in the initial access of the UE, the beam sweeping is performed so that the SS/PBCH block is transmitted to all coverage regions of the cell. L SS/PBCH blocks are transmitted in a 5 ms window as in FIG. 4. In this case, L is defined as a different value for each operating frequency.

The UE may detect the PBCH by using a demodulation reference signal (DMRS) included in the SS/PBCH block. The DMRS for the detection of the PBCH is defined in the time/frequency domain as in FIG. 6.

The PBCH is transmitted at a period of 80 ms. A payload transmitted to the PBCH is a total of 56 bits, which is constituted by a 32-bit payload and a 24-bit CRC. Table 5 shows a PBCH payload. Here, the 32-bit payload is constituted by a 24-bit MIB and 8-bit physical layer related information.

TABLE 5

|  | Below 6 GHz | Above 6 GHZ |
| --- | --- | --- |
| SFN | 10 * | 10 * |
| Half frame indication | 1 ** | 1 ** |
| MSB of SS/PBCH index | 0 | 3 *** |
| SSB-Subcarrier Offset | 5 **** {0, . . . , 23} | 4 {0, . . . , 11} |
| Subcarrier Spacing | 1 {15 kHz, 30 KHz} | 1 {60 kHz, 120 KHz} |
| PDCCH Configuration for SIB1 | 8 bits | 8 |
| DMRS Type A position | 1 {2, 3} | 1 {2, 3} |
| Cell Barred | 1 {barred, notBarred} | 1 {barred, notBarred} |
| Intra Frequency Reselection | 1 {allowed, notAllowed} | 1 {allowed, notAllowed} |
| Spare | 4 ***** | 2 |
| CRC | 24 | 24 |

In Table 5 above, 8-bit physical layer related information represents 4 bits in information expressed as *, 1 bit in information expressed as , 3 bits in information expressed as *, 1 bit in information expressed as **, and 2 bits in information expressed as ***.

SFN is a field representing a system frame number of 10 bits.

Half frame indicator as 1 bit is a field indicating a 5 ms half frame boundary.

SS/PBCH block index is a field indicating an index of the SS/PBCH block currently transmitted among L SS/PBCH blocks transmitted for the beam sweeping operation.

SSB-subcarrier offset is a 5-bit or 4-bit field indicating a subcarrier number which is different from a reference resource block (RB).

Subcarrier spacing is a 1-bit field indicating a subcarrier spacing supported by the system among multiple subcarrier spacings.

PDCCH configuration for SIB1 is an 8-bit field indicating information on a search space configuration of the PDCCH in which control information for receiving the PDSCH in which the system information is transmitted is transmitted in addition to the MIB.

DMRS type A position is a field indicating the number of symbols in which type A demodulation reference signal (DMRS) is transmitted.

Cell barred and inter-frequency reselection are fields indicating information defined in a higher layer.

SIB1 is transmitted at a period of 20 ms and repeated by the unit of 160 ms. SIB1 includes information regarding scheduling of another SIB information.

Hereinafter, system information acquisition will be described in more detail.

System Information Acquisition

FIG. 7 illustrates a process of acquiring system information (SI) to which a method proposed by the present disclosure is applicable.

The UE may acquire AS-/NAS-information through an SI acquisition process. The SI acquisition process may be applied to UEs which are in an RRC_IDLE state, an RRC_INACTIVE state, an RRC_CONNECTED state.

The SI is divided into a master information block (MIB) and a plurality of system information blocks (SIBs). SI other than the MIB may be referred to as Remaining Minimum System Information (RSI).

The MIB includes information/parameters related to SystemInformationBlock1 (SIB1) reception and is transmitted through the PBCH of the SSB. In initial cell selection, the UE assumes that the half frame with the SSB is repeated with a periodicity of 20 ms. The UE may check whether a Control Resource Set (CORESET) for a Type0-PDCCH common search space exists based on the MIB. The Type0-PDCCH common search space is a kind of PDCCH search space and is used to transmit a PDCCH for scheduling an SI message. If there is the Type0-PDCCH common search space, the UE may determine (i) a plurality of continuous RBs and one or more continuous symbols constituting the CORESET and (ii) a PDCCH occasion (i.e., a time domain location for receiving the PDCCH) based on information (e.g., pdcch-ConfigSIB1) in the MIB. If there is no Type0-PDCCH common search space, pdcch-ConfigSIB1 provides information on a frequency location where SSB/SIB1 exists and a frequency range where the SSB/SIB1 does not exist.

The SIB1 contains information related to the availability and scheduling (e.g., transmission periodicity, SI-window size) of the remaining SIBs (hereinafter, referred to as SIBx, x is an integer of 2 or more). For example, the SIB1 may inform whether the SIBx is periodically broadcasted or whether the SIBx is provided by a request of the UE according to an on-demand scheme.

When the SIBx is provided by the on-demand scheme, the SIB1 may include information which the UE requires for performing an SI request. The SIB1 is transmitted through the PDSCH, the PDCCH for scheduling the SIB1 is transmitted through the Type0-PDCCH common search space, and the SIB1 is transmitted through the PDSCH indicated by the PDCCH.

The SIBx is included in the SI message and transmitted through the PDSCH. Each SI message is transmitted within a time window (i.e., SI-window) which periodically occurs.

FIG. 8 is a view for describing a mechanism of transmission of a paging to which a method proposed by the present disclosure is applicable.

Paging is used when announcing an incoming call to the UE, when announcing that the system information is changed, and when transmitting a public warning signal (PWS) such as an earthquake or tsunami. Paging transmission operates according to a discontinuous reception (DRX) cycle of the UE as in FIG. 8.

Referring to FIG. 8, the UE identifies whether there is the PDSCH transmitted thereto by detecting the PDCCH after wake-up at a specific paging occasion according to the discontinuous reception (DRX) cycle. Thereafter, the UE enters a sleep mode or enters a data reception mode again.

FIG. 9 is a view for describing beam sweeping based on a paging mechanism to which a method proposed by the present disclosure is applicable.

FIG. 9 is a view illustrating a paging mechanism. Multiple paging time slots are present in one paging occasion (PO). Paging information is beamformed and transmitted through each paging time slot. In this case, the paging information which is beam-swept and transmitted is the same.

Control information of the PDSCH for transmitting the paging information is transmitted through the PDCCH. A search space for monitoring the PDCCH is transmitted to the UE through the SIB1. In Table 6 below, each field of paging downlink control information (DCI) is organized.

TABLE 6

| Field | # of bits | Description |
|---|---|---|
| Short message indicator | 2 | 00: reserved<br>01: only scheduling information<br>10: only short message<br>11: both scheduling information and short message |
| Short message | [8] | If only scheduling information is carried, the field is reserved |
| Frequency domain resource allocation | | If only short message is carried, the field is reserved |
| Time domain resource allocation | 4 | If only short message is carried, the field is reserved |
| VRB to PRB mapping | 1 | If only short message is carried, the field is reserved |
| MCS | 5 | If only short message is carried, the field is reserved |
| Redundancy version | 2 | |
| Reserved bits | [16] | |

Carrier Aggregation in General

Communication environments considered in the embodiments of the present disclosure includes all of multi-carrier supporting environments. In other words, a multi-carrier system or a carrier aggregation system according to the present disclosure refers to the system utilizing aggregation of one or more component carriers having bandwidth narrower than target bandwidth to establish a broadband communication environment.

A multi-carrier according to the present disclosure refers to aggregation of carriers, and the carrier aggregation in this sense refers to not only the aggregation of contiguous carriers but also the aggregation of non-contiguous carriers. Also, the numbers of component carriers aggregated for downlink and uplink transmission can be configured differently from each other. The case where the number of downlink component carriers (hereinafter, it is called 'DL CC') is the same as the number of uplink component carriers (hereinafter, it is called 'UL CC') is called symmetric aggregation, whereas it is called asymmetric aggregation otherwise. The term of carrier aggregation may be used interchangeably with bandwidth aggregation and spectrum aggregation.

Carrier aggregation composed of a combination of two or more component carriers is intended to support bandwidth of up to 100 MHz for the case of the LTE-A system. When one or more carriers having narrower bandwidth than target bandwidth are combined, the bandwidth of the carrier to be combined may be limited to the bandwidth defined by an existing system to maintain compatibility with the existing IMT system. For example, while the existing system supports bandwidth of 1.4, 3, 5, 10, 15, and 20 MHz, the 3GPP LTE-A system may support bandwidth larger than 20 MHz by using a combination of the predefined bandwidth to maintain compatibility with the existing system. Also, a carrier aggregation system according to the present disclosure may support carrier aggregation by defining new bandwidth independently of the bandwidth used in the existing system.

Hereinafter, a concept of a cell for managing the radio resource will be described.

The carrier aggregation environment may be referred to as a multiple cell environment. A cell is defined as a combination of a pair of a DL CC and an UL CC, but the UL CC is not an essential element. Therefore, a cell may be composed of downlink resources only or a combination of downlink and uplink resources. In case a particular UE is linked to only one configured serving cell, one DL CC and one UL CC are employed. However, if the particular UE is linked to two or more configured serving cells, as many DL CCs as the number of cells are employed while the number of UL CCs may be equal to or smaller than the number of DL CCs.

Meanwhile, the DL CCs and the UL CCs may be composed in the opposite way. In other words, in case a particular UE is linked to a plurality of configured serving cells, a carrier aggregation environment which has more UL CCs than DL CCs may also be supported. In other words, carrier aggregation may be understood as a combination of two or more cells having different carrier frequencies (center frequencies of the cells). At this time, the term of 'cell' should be distinguished from the 'cell' usually defined as a region covered by an eNB.

The LTE-A system defines a primary cell (PCell) and a secondary cell (SCell). A PCell and an SCell may be used as a serving cell. A UE being in an RRC_CONNECTED state but not being configured for carrier aggregation or not supporting carrier aggregation may be linked to one or more serving cells, and the entire serving cells include a PCell and one or more SCells.

A serving cell (PCell and SCell) may be configured through an RRC parameter. PhysCellId is a physical layer identifier of a cell, having an integer value ranging from 0 to 503. SCellIndex is a short identifier used for identifying an SCell, having an integer value ranging from 1 to 7. ServCellIndex is a short identifier used for identifying a serving cell (PCell or SCell), having an integer value ranging from 0 to 7. The value of 0 is applied to a PCell, and SCellIndex is pre-assigned to be applied to an SCell. In other words, the cell which has the smallest cell ID (or cell index) of ServCellIndex becomes the PCell.

A PCell refers to a cell operating on a primary frequency (or a primary CC). A PCell may be used for an UE to perform an initial connection establishment process or a connection re-establishment process; a PCell may refer to the cell indicated during a handover process. Also, a PCell refers to the cell which plays a central role for control-related communication among configured serving cells in a carrier aggregation environment. In other words, a UE is capable of receiving and transmitting a PUCCH only through its own PCell; also, the UE may obtain system information or modify a monitoring procedure only through the PCell. The Evolved Universal Terrestrial Radio Access Network (E-UTRAN) may change only the PCell by using an RRC connection reconfiguration message (RRCConnectionReconfiguration) of a higher layer including mobility control information (mobilityControlInfo) so that the UE supporting carrier aggregation environments may carry out a handout procedure.

An SCell refers to a cell operating on a secondary frequency (or a secondary CC). For a particular UE, only one PCell is allocated, but one or more SCells may be allocated. An SCell may be composed after configuration for an RRC connection is completed and may be used to provide additional radio resources. A PUCCH does not exist in the remaining cells except for PCells among the serving cells configured for a carrier aggregation environment, i.e., SCells. When adding an SCell to a UE supporting a carrier aggregation environment, the E-UTRAN may provide all of the system information related to the operation of a cell in the RRC_CONNECTED state through a dedicated signal. Modification of system information may be controlled according to release and addition of a related SCell, and at this time, an RRC connection reconfiguration (RRCConnectionReconfiguration) message of a higher layer may be used. The E-UTRAN, instead of broadcasting a signal within an SCell, may carry out dedicated signaling using parameters different for each UE.

After the initial security activation process is started, the E-UTRAN may form a network including one or more SCells in addition to a PCell defined in the initial step of a connection establishment process. In a carrier aggregation environment, a PCell and an SCell may operate as an independent component carrier. In the embodiment below, a primary component carrier (PCC) may be used in the same context as the PCell, while a secondary component carrier (SCC) may be used in the same context as the SCell.

FIG. 10 illustrates one example of a component carrier and carrier aggregation in a wireless communication system to which the present disclosure can be applied.

(a) of FIG. 10 shows a single carrier structure defined in the LTE system. Two types of component carriers are used: DL CC and UL CC. A component carrier may have frequency bandwidth of 20 MHz.

(b) of FIG. 10 shows a carrier aggregation structure used in the LTE A system. (b) of FIG. 10 shows a case where three component carriers having frequency bandwidth of 20 MHz are aggregated. In this example, 3 DL CCs and 3 UL CCs are employed, but the number of DL CCs and UL CCs is not limited to the example. In the case of carrier aggregation, the UE is capable of monitoring 3 CCs at the same time, capable of receiving a downlink signal/data and transmitting an uplink signal/data.

If a particular cell manages N DL CCs, the network may allocate M (MSN) DL CCs to the UE. At this time, the UE may monitor only the M DL CCs and receive a DL signal from the M DL CCs. Also, the network may assign priorities for L (L≤M≤N) DL CCs so that primary DL CCs may be allocated to the UE; in this case, the UE has to monitor the L DL CCs. This scheme may be applied in the same manner to uplink transmission.

Linkage between a carrier frequency of downlink resources (or DL CC) and a carrier frequency of uplink resources (or UL CC) may be designated by a higher layer message such as an RRC message or system information. For example, according to the linkage defined by system information block type 2 (SIB2), a combination of DL resources and UL resources may be determined. More specifically, the linkage may refer to a mapping relationship between a DL CC through which a PDCCH carrying an UL grant is transmitted and an UL CC that uses the UL grant; or a mapping relationship between a DL CC (or an UL CC) through which data for HARQ signal are transmitted and an UL CC (or a DL CC) through which a HARQ ACK/NACK signal is transmitted.

FIG. 11 illustrates an example where a system supporting carrier aggregation distinguishes cells.

Referring to FIG. 11, a configured cell is a cell which is configured for carrier aggregation based on a measurement report among cells of an eNB and is configured for each UE as shown in FIG. 10. A configured cell may reserve a resource for ack/nack transmission in advance with respect to PDSCH transmission. An activated cell is a cell configured to actually transmit a PDSCH/PUSCH among the configured cells, which performs Channel State Information (CSI) reporting for PDSCH/PUSCH transmission and Sounding Reference Signal (SRS) transmission. A de-activated cell is a cell configured not to perform PDSCH/PUSCH transmission by a command from the eNB or timer operation, which may stop CSI reporting and SRS transmission.

Random Access Procedure

The random access procedure of the UE may be summarized as in Table 7 below.

TABLE 7

| | Type of signal | Acquired operation/information |
|---|---|---|
| First phase | PRACH Preamble in UL | Initial beam acquisition Random selection of RA-preamble ID |
| Second phase | Random access response on DL-SCH | Timing alignment information RA-preamble ID Initial UL grant or temporary C-RNTI |
| Third phase | UL transmission on UL-SCH | RRC connection request UE identifier |
| Fourth phase | Contention resolution on DL | Temporary C-RNTI on PDCCH for initial access C-RNTI on PDCCH for UE in RRC_CONNECTED |

Hereinafter, the random access procurer will be described in more detail with reference to FIG. 12.

FIG. 12 is a flowchart for describing a contention/contention-free based random access procedure to which a method proposed by the present disclosure is applicable.

The UE may be scheduled with uplink transmission only when a transmission timing is synchronized. Accordingly, a random access channel (RACH) plays an important role as an interface between an asynchronous UE and an orthogonal transmission scheme of an uplink radio access. The RACH is used for the initial network access, but may not be used for transferring user data. Instead, the RACH is used for achieving uplink time synchronization for a UE which does not yet acquire uplink synchronization (or loses the uplink synchronization). When the uplink synchronization for the UE is achieved, the BS may schedule orthogonal UL transmission resources for the corresponding UE.

The random access procedure is constituted by two types. Specifically, the random access procedure is performed as a contention based (intrinsic conflict risk suggestion) or contention-free type. The UE initiates a contention-based random access procedure for all use cases including an initial access. In this procedure, an RACH preamble signature is randomly selected by the UE. As a result, since one or more UEs are capable of simultaneously transmitting the same RACH preamble signature, a subsequent contention resolution process is required. In the case of a use case such as handover, the BS has an option to prevent the contention from occurring by allocating a dedicated signature to the UE. In this case, a contention-free based access (i.e., a dedicated random access) is made, and the contention-free based access is faster than a contention based access. In the case of time-critical handover, the option is a particularly important factor.

(a) of FIG. 12 and (b) of FIG. 12 illustrate contention based and contention-free based random access procedures, respectively.

Referring to (a) of FIG. 12, four phases of the contention-based random access procedure are as follows.

Phase 1: RACH preamble transmission
Phase 2: Random access response
Phase 3: Layer 2/layer 3 message (RRC connection request)
Phase 4: Contention resolution message (RRC connection setup)

Referring to (b) of FIG. 12, the contention-free based random access procedure is constituted by three following phases.

Phase 0: RACH preamble allocation through dedicated signaling
Phase 1: RACH preamble transmission
Phase 2: Random access response The random access response (RAR) is transmitted by the BS through a physical downlink shared channel (PDSCH), and the corresponding PDSCH is transmitted jointly with a random access radio network temporary identifier (RA-RNTI) which is an ID. The RA-RNTI is used for identifying a time/frequency at which the preamble is detected. When multiple UEs collide by selecting the same signature in the same preamble time-frequency resource, each of the UEs receives the RAR. The RAR transfers an identity of the detected preamble, a timing alignment command (timing advance (TA)) for subsequent uplink transmission, an initial uplink resource grant for transmission of phase 3 message (Msg3), and allocation of a temporary cell radio network temporary identifier (C-RNTI). The C-RNTI may be permanent as a result of a next phase (contention resolution) and may not be permanent.

QCL (Quasi-Co Location)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured).

For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

In the present disclosure, the above Quasi co-location related definitions are not distinguished. That is, the Quasi co-location concept may follow one of the above definitions. Alternatively, as a similar another type, a definition of the corresponding Quasi co-location concept may also be modified to a type (e.g., it is assumed that the UE is an antenna port performing transmission at the same transmission point) in which it may be assumed as if the transmission is performed at a co-location between antenna ports in which the Quasi co-location assumption is established. The similar modified examples may be applied to the embodiments of the present disclosure. In the present disclosure, the above Quasi co-location related definitions are mixedly used for convenience.

According to the above definition, the UE cannot assume the same large-scale channel properties between corresponding antenna ports (APs) for "non-quasi-co-located (NQCL) antenna ports". That is, in this case, a typical UE receiver needs to perform independent processing for each set non-quasi-co-located (NQCL) AP with respect to timing acquisition and tracking, frequency offset estimation and compensation, delay estimation, and Doppler estimation.

Among the APs that can assume QC, there is an advantage that the UE may perform the following operations.

With respect to Delay spread & Doppler spread, the UE may similarly apply estimation results of the power-delay-profile, delay spread and Doppler spectrum, and Doppler spread for any one port to a Wiener filter and the like used for channel estimation for other ports.

With respect to Frequency shift & Received Timing, the UE may perform time and frequency synchronization on any one port and then apply the same synchronization to the demodulation of the other port.

With respect to average received power, the UE may average RSRP measurements for 2 or more antenna ports.

Hereinafter, matters related to the system information in a terahertz band will be described in detail.

According to the LTE/NR standard, the master information block (MIB) is transmitted through a physical broadcast channel (PBCH). When the PBCH is transmitted by performing the beamforming, the PBCH should be transmitted in multiple directions in the time domain in order to transmit the PBCH to all regions of the cell. To this end, a lot of time resources should be allocated in order to transmit the PBCH. When there are not a lot of users in the cell, such a transmission scheme is inefficient in terms of resource utilization. In particular, in the case of the terahertz (THz) frequency band, more beam sweeping should be made due to a narrower beam width, so more time resources should be allocated for the transmission of the PBCH.

In order to solve such a point, a method of utilizing the secondary cell (SCell) in the carrier aggregation may be considered. Specifically, a method of not transmitting the MIB of the secondary cell (SCell) through the PBCH but transmitting the MIB by using the primary cell (PCell) may be considered.

As an example, the cell (e.g., the cell of the LTE/NR) of the existing frequency band may operate as the primary cell (PCell), and the cell in the THz frequency band may operate as the secondary cell (SCell). In this case, MIB transmission of the THz SCell may be efficiently performed by using the LTE/NR PCell.

In embodiments to be described later, it is assumed and described that the primary cell (PCell) is the cell of the LTE/NR, and the secondary cell (SCell) is the cell of the THz frequency band. However, this is just convenience of description, and the methods disclosed in the present disclosure may be applied even to a case where the cell of the THz frequency band operates as the primary cell (PCell), and the cell (e.g., the cell of the LTE/NR) of the existing frequency band operates as the secondary cell (SCell).

Furthermore, the methods to be described later are just distinguished for convenience and it is needless to say that some components of any one embodiment may be substituted with some components of another embodiment or may be applied in combination with each other.

Instead of designing the PBCH of the THz frequency band for the transmission of the master information block (MIB), the MIB may be transmitted by using a synchronization channel of the LTE/NR PCell and SCell.

In the case of the NR standard, generating master information block (MIB) contents for a frequency band of 6 GHz or more in the higher layer and generating the MIB contents in the physical layer are distinguished.

Contents generated in the higher layer are SFN, PDCCH configuration for SIB1, cell barring, cell re-selection, subcarrier spacing, etc.

Contents in the physical layer are SFN, half frame indicator, SSB index, etc.

The MIB information of the THz SCell which may be transmitted in the LTE/NR PCell may include the contents (e.g., SFN, PDCCH configuration for SIB1, cell barring, and cell re-selection) generated in the higher layer.

The synchronization channel of the THz SCell may include the information (e.g., SSB index and half frame indicator). When multiple subcarrier spacings are supported in the THz SCell, subcarrier spacing information may be transmitted through the synchronization channel of the LTE/NR PCell or the THz SCell. The SFN information may be acquired in the THz SCell without information transmission in the PCell through mapping between the PCell SFN and the THz SCell SFN. For example, the SFN information of the SCell may be acquired from Equation 4 below.

$$SFN_{SCell}=SFN_{PCell}+\text{offset} \qquad \text{[Equation 4]}$$

In Equation 4 above, when SFN boundaries of the PCell and the SCell do not coincide with each other by the unit of 10 ms, the offset is a value representing a difference between both boundaries, and may have a range of 0<=offset<10 ms.

According to another embodiment, some or all of the information generated in the physical layer may be transmitted in the LTE/NR PCell.

When the MIB information of the THz SCell is transmitted in the LTE/NR PCell, an SCell additional message for performing an SCell configuration may be used. The SCell addition message may be an RRC reconfiguration message related to add/modify/release of the SCell.

According to an embodiment, an SSB index which is information on a beamforming direction of the THz SCell may be transmitted through the synchronization channel of the THz SCell. In this case, the SSB index may be acquired through a secondary synchronization channel (secondary synchronization signal (SSS)). Since a calculation amount for initial time/frequency synchronization acquisition is large, when a complexity of UE implementation is considered, it is preferable that a primary synchronization channel (primary synchronization signal (PSS) transmits additional information (e.g., SSB index) to the SSS.

According to an embodiment, the SSB index which is the information on the beamforming direction of the THz SCell may be indirectly acquired from SSB index or CSI-RS resource information of the PCell of the LTE/NR or acquired from the master information block (MIB) transmitted in the LTE/NR PCell. As an example, the UE may indirectly acquire the beamforming direction from CSI feedback information (e.g., Precoding Matrix Indicator, (PMI))) for the CSI-RS resource of the LTE PCell.

According to an embodiment, the information on the beamforming direction of the THz SCell may be acquired from a CSI-RS resource (e.g., CSI-RS resource ID) transmitted in the NR PCell. In this case, mapping between the CSI-RS resource ID of the PCell and the beamforming direction (e.g., SSB index, CSI-RS resource ID) of the THz SCell may be required. In this case, the mapping may be 1:1, x:1, and 1:x (x>1) relations. The mapping of 1:x means that the beam width of the PCell is larger than the beam width of the SCell, so multiple beamforming directions of the SCell is included in one beamforming direction of the PCell. In other words, the 1:x mapping may mean that a coverage region according to one PCell beam includes a coverage region according to x SCell beams. According to an embodiment, the UE may acquire the beamforming direction of the THz SCell from the SSB index of the NR PCell. Even in this case, similarly to the above-described embodiment, mapping between the SSB index of the PCell and beamforming direction of the THz SCell may be 1:1, x:1, and 1:x (x>1) relations.

The mapping relation according to the above-described embodiment may be predefined or transmitted through RRC/MAC/L1 signaling.

As an example, beamforming direction information of the SCell corresponding to the beamforming direction provided in the PCell may be transmitted in association with a time point when the synchronization channel of the SCell is transmitted. The reason is that the synchronization channel also operates in a beam sweeping scheme. When the 1:x mapping is assumed, x SCell beamforming directions should be indicated. In this regard, a time point when x synchronization channels are transmitted may be implemented to be indicated. In the case of the NR standard, a 10-ms radio frame is constituted by multiple slots and one slot is constituted by 14 orthogonal frequency division multiplexing (OFDM) symbols. In this case, the beamforming direction information of the SCell may be transferred according to Methods 1 to 4 below.

[Method 1]

A method of transferring the beamforming direction information of the SCell to a bitmap constituted by bits which are as large as the number of slots in the radio frame may be considered.

The beamforming direction of the SCell in the bitmap may be indicated based on a bit corresponding to a slot in which a synchronization channel having a beamforming direction which is the same as the beamforming direction of the SCell is transmitted. That is, among the slots in the radio frame, the slot in which the synchronization channel having a beamforming direction which is the same as the beamforming direction of the SCell is transmitted may be represented by 1 and other slots may be represented by 0.

[Method 2]

A method of transferring the beamforming direction information of the SCell to a bitmap constituted by bits which are as large as the number of slots in the synchronization channel is transmitted may be considered.

The beamforming direction of the SCell in the bitmap may be indicated based on a bit corresponding to a slot in which a synchronization channel having a beamforming direction which is the same as the beamforming direction of the SCell is transmitted. That is, among the slots in which the synchronization channel is transmitted, the slot in which the synchronization channel having a beamforming direction which is the same as the beamforming direction of the SCell is transmitted may be represented by 1 and other slots may be represented by 0.

[Method 3]

A method of directly transmitting an index of the slot in which the synchronization channel having a beamforming direction which is the same as the beamforming direction of the SCell is transmitted among all slots in the radio frame may be considered.

In this case, a number of bits required for transmitting the index may be $x*\text{ceil}(\log_2 N_{tot\_slot})$. Here, ceil( ) represents an operator of performing a rounding calculation of a decimal point or less and $N_{tot\_slot}$ represents the total number of slots in the radio frame.

[Method 4]

A method of directly transmitting an index of the slot in which the synchronization channel having a beamforming direction which is the same as the beamforming direction of the SCell is transmitted among the slots in which the synchronization channel is transmitted may be considered.

In this case, a bit number required for transmitting the index may be $x*\text{ceil}(N_{tot\_sync\_slot})$. Here, ceil( ) represents an operator of performing a rounding calculation of a decimal point or less and $N_{tot\_sync\_slot}$ represents the number of slots in which the synchronization channel is transmitted in the radio frame.

The master information block (MIB) of the THz SCell transmitted in the LTE/NR PCell has a cell specific feature, while the SSB index has a UE specific feature.

An embodiment for a process in which the UE performing communication in the terahertz frequency band acquires the MIB and the system information generated in the physical layer will be described below.

EMBODIMENT 1

A legacy primary cell (PCell) may transmit both the information generated in the higher layer and the information generated in the physical layer among the MIB information of the THz secondary cell (SCell).

The legacy primary cell transmits, to the UE, signaling (e.g., RRC signaling) for configuring a THz cell as the secondary cell (SCell). The signaling may include both the information generated in the higher layer and the information generated in the physical layer among the information of the master information block (MIB) of the THz SCell. The signaling may include the information according to Methods 1 to 4 described above.

The UE may acquire synchronization by receiving the synchronization channel transmitted in the THz SCell.

The UE may acquire the beamforming direction information of the THz SCell from the MIB information of the THz SCell transmitted in the legacy PCell.

EMBODIMENT 2

The legacy PCell may transmit some of the information generated in the higher layer and the information generated in the physical layer among the MIB information of the THz SCell. Some of the information generated in the physical layer may include the beamforming direction information (the information according to Methods 1 to 4 described above) of the THz SCell.

The legacy PCell transmits, to the UE, signaling (e.g., RRC signaling) for configuring the THz cell as the SCell. The signaling may include some of the information generated in the higher layer and the information generated in the physical layer among the information of the master information block (MIB) of the THz SCell.

The UE may acquire synchronization by receiving the synchronization channel transmitted in the THz SCell.

The UE may acquire, from the legacy PCell), some of the information generated in the higher layer and the information generated in the physical layer among the MIB information of the THz SCell, and acquire the rest of the information generated in the physical layer through the synchronization channel.

The UE may acquire the beamforming direction information of the THz SCell from the signaling of the legacy PCell and the synchronization channel of the THz SCell.

EMBODIMENT 3

The legacy PCell may transmit some of the information generated in the higher layer and the information generated in the physical layer among the MIB information of the THz SCell. In this case, the beamforming direction information of the THz SCell may be transmitted through the synchronization channel of the THz SCell.

The legacy PCell transmits, to the UE, signaling (e.g., RRC signaling) for configuring the THz cell as the SCell. The signaling may include some of the information generated in the higher layer and the information generated in the physical layer among the information of the master information block (MIB) of the THz SCell.

The UE may acquire synchronization by receiving the synchronization channel transmitted in the THz SCell. The UE may acquire some of the information generated in the higher layer and the information generated in the physical layer among the MIB information of the THz SCell, and acquire the rest of the information generated in the physical layer through the synchronization channel.

The synchronization channel may include the beamforming direction information of the THz SCell. As an example, the synchronization channel may include the information according to Methods 1 to 4 described above.

The UE may acquire the beamforming direction information of the THz SCell from the signaling of the legacy PCell and the synchronization channel of the THz SCell.

Hereinafter, matters related to the transmission of the paging information will be described.

The paging information is transmitted when a new call, etc., occurs due to a system information change and an emergency situation (e.g., tsunami and earthquake). The paging information is also transmitted by performing the beamforming like the synchronization signal or the master information block (MIB) to support all regions of the cell.

The UE identifies whether there is data or call transmitted thereto only during a specific time interval in a power saving mode according to a discontinuous reception (DRX) period, and then enters the power saving mode again to minimize power consumption. In this case, since the UE should identify multiple beamforming directions in order to determine data transmitted thereto or whether there is the call, the power consumption of the UE increases. This occurs when the UE is in an RRC_IDLE or RRC_INACTIVE state without information on the beamforming direction transmitted by the BS.

The LTE/NR PCell transmits paging information of the THz SCell to reduce resource consumption for paging information transmission of the THz SCell and reduce even the power consumption of the UE.

In this case, when the DRX operations of the LTE/NR PCell and the THz SCell are configured to be performed jointly (i.e., DRX cycles are the same), an active time for PDCCH monitoring of the UE is the same between the LTE/NR PCell and the THz SCell. Accordingly, the paging information of the THz SCell is transmitted in the LTE/NR PCell to efficiently utilize the resource of the THz SCell. An information element of a paging message of the LTE/NR PCell is shown in Table 8 below.

TABLE 8

| Paging record list | Paging record | UE ID CN domain (CS or PS) SCell index |
| --- | --- | --- |
| System information modification (True/False) | | |
| ETWS indication (True/False) | | |
| CMAS indication (True/False) | | |

In the case where an index value other than the PCell is included in the field corresponding to the SCell index in Table 8 above, the case means that the paging information is transferred to the THz SCell. Accordingly, when the index included in the corresponding field (SCell index) coincides with the THz SCell index, the UE starts an operation for data reception of the THz SCell. In this case, the above-described embodiment may be applied to acquisition of information on a beam direction of the THz SCell.

An embodiment of a process in which the UE performing communication in the THz cell receives the paging information is as follows.

The UE monitors the PDCCH transmitted in the legacy primary cell during an on-time interval of the DRX cycle.

When the UE detects the PDCCH for transmitting the paging information, the UE identifies whether to page the THz SCell.

In the case of the paging for the THz SCell, the UE starts data transmission and reception by initiating the PDCCH monitoring of the THz SCell.

In the case of not the paging for the THz SCell, the UE enters a DRX mode again.

In terms of implementation, the operations (e.g., operations related to transmission and reception of the system information of the SCell) of the base station/UE according to the above-described embodiments may be processed by apparatuses (e.g., processors 102 and 202 in FIG. 16) in FIGS. 15 to 19 to be described below.

Further, the operations (e.g., operations related to transmission and reception of the system information of the SCell) of the base station/UE according to the above-described embodiment may be stored in memories (e.g., one or more memories 104 and 204 in FIG. 16) in the form of a command/program (e.g., instruction or executable code) for driving at least one processor (e.g., reference numerals 102 and 202 in FIG. 16).

The above-described embodiments will be described in detail with reference to FIGS. 13 and 14 below in terms of the operation of the UE. The methods to be described later are just distinguished for convenience and it is needless to say that some components of any one embodiment may be substituted with some components of another embodiment or may be applied in combination with each other.

FIG. 13 is a flowchart for describing a method of receiving, by a UE, system information in a wireless communication system according to an embodiment of the present disclosure.

Referring to FIG. 13, the method of receiving, by the UE, system information in a wireless communication system supporting carrier aggregation according to an embodiment of the present disclosure may include an RRC configuration request message transmitting step (S1310), an RRC configuration message receiving step (S1320), an RRC configuration complete message transmitting step (S1330), an RRC reconfiguration message receiving step (S1340), and a synchronization signal receiving step (S1350).

In S1310, the UE transmits an RRC connection request message to the BS. The RRC connection request message may be Msg3 of a random access procedure.

According to S1310 described above, an operation of a UE (reference numeral 100/200 in FIGS. 15 to 19) which transmits the RRC connection request message to a BS (reference numeral 100/200 in FIGS. 15 to 19) may be implemented by devices in FIGS. 15 to 19. For example, referring to FIG. 16, one or more processors 102 may control one or more transceivers 106 and/or one or more memories 104 to transmit the RRC connection request message to the BS 200.

In S1320, the UE receives an RRC connection setup message from the BS. The RRC connection setup message may be Msg4 of the random access procedure.

According to S1320 described above, an operation of a UE (reference numeral 100/200 in FIGS. 15 to 19) which receives the RRC connection setup message from a BS (reference numeral 100/200 in FIGS. 15 to 19) may be implemented by devices in FIGS. 15 to 19. For example, referring to FIG. 16, one or more processors 102 may control one or more transceivers 106 and/or one or more memories 104 to receive the RRC connection setup message from the BS 200.

In S1330, the UE transmits an RRC connection setup complete message to the BS. The RRC connection setup complete message may be an RRC message (RRCSetupComplete message).

According to S1330 described above, an operation of the UE (reference numeral 100/200 in FIGS. 15 to 19) which transmits the RRC connection setup complete message to the BS (reference numeral 100/200 in FIGS. 15 to 19) may be implemented by the devices in FIGS. 15 to 19. For example, referring to FIG. 16, one or more processors 102 may control one or more transceivers 106 and/or one or more memories 104 to transmit the RRC connection setup complete message to the BS 200.

In S1340, the UE receives, from the BS, an RRC reconfiguration message related to a configuration of a secondary cell (SCell) through a primary cell (PCell) of the BS.

According to an embodiment, the secondary cell (SCell) may be a cell which operates in a specific frequency band. As an example, the specific frequency band may be a THz frequency band. A beam width of the secondary cell (SCell) based on the specific frequency band may be smaller than a beam width of the primary cell (PCell). One beamforming direction of the primary cell (PCell) may include a plurality of beamforming directions of the secondary cell (SCell) due to a difference of the beam width. In other words, a coverage region according to one primary cell (PCell) beam may include coverage regions according to a plurality of SCell beams.

According to S1340 described above, an operation of the UE (reference numeral 100/200 in FIGS. 15 to 19) which receives, from the BS (reference numeral 100/200 in FIGS. 15 to 19), an RRC reconfiguration message related to the configuration of the secondary cell (SCell) through the primary cell (PCell) of the BS may be implemented by the devices in FIGS. 15 to 19. For example, referring to FIG. 16, one or more processors 102 may control one or more transceivers 106 and/or one or more memories 104 so as to receive the RRC reconfiguration message related to the configuration of the secondary cell (SCell) from the BS 200 through the primary cell (PCell) of the BS.

In S1350, the UE receives, from the secondary cell (SCell), a synchronization signal (SS) based on the RRC reconfiguration message.

According to an embodiment, the RRC reconfiguration message may include at least one of a master information block (MIB) of the secondary cell (SCell) or a time point when the synchronization signal is transmitted.

According to an embodiment, an SS block in which the synchronization signal is transmitted may be based on beam information of the primary cell (PCell) and the time point when the synchronization signal is transmitted.

According to an embodiment, the SS block may be one of a plurality of SS blocks based on the beam information of the primary cell (PCell). That is, the beamforming direction according to each SS block among the plurality of SS blocks is included in the beamforming direction based on the beam information of the primary cell (PCell). The beam information of the primary cell (PCell) may include at least one of a channel state information reference signal resource ID (CSI-RS resource ID), a precoding matrix index (PMI), or an SS block index (SSB index).

According to an embodiment, the time point when the synchronization signal is transmitted may be expressed as a specific bitmap. The specific bitmap may be a bitmap according to Method 1 or 2 described above. As an example, a number of bits of the specific bitmap may be based on a total number of slots included in a radio frame. As another example, the number of bits of the specific bitmap may be based on the number of slots in which the synchronization signal is transmitted in the radio frame.

According to an embodiment, the time point when the synchronization signal is transmitted may be expressed as an index representing a specific slot in the radio frame. The index may be an index according to Method 3 or 4 described above. According to an embodiment, a number of bits of the index may be based on a number of the plurality of SS blocks.

As an example, the number of bits of the index may be $x*\text{ceil}(\log_2 N_{tot\_slot})$, and here, x may represent the number of the plurality of SS blocks, ceil( ) may represent an operator of performing a rounding operation of a decimal point or less, and $N_{tot\_slot}$ may represent the total number of slots in the radio frame.

As another example, the number of bits of the index may be $x*\text{ceil}(\log_2 N_{tot\_sync\_slot})$, and here, x may represent the number of the plurality of SS blocks, ceil( ) may represent an operator of performing a rounding operation of a decimal point or less, and $N_{tot\_sync\_slot}$ may represent the number of slots in which the synchronization signal is transmitted in the radio frame.

According to an embodiment, the RRC reconfiguration message may include a portion of the master information block (MIB).

That is, a portion of the master information block (MIB) may be included in the RRC reconfiguration message and a remainder of the master information block (MIB) is included in the synchronization signal. A portion of the master information block (MIB) may be information generated in the higher layer and the remainder of the master information block (MIB) may be information generated in the physical layer.

According to an embodiment, the synchronization signal may include a primary synchronization signal (PSS) and a secondary synchronization signal (SSS). In the case of the primary synchronization signal (PSS), a lot of operations are required for synchronization acquisition, so when complexity of UE implementation is considered, the remainder of the master information block (MIB) may be included in the secondary synchronization signal (SSS).

According to an embodiment, step S1350 above may further includes receiving a paging message. Specifically, in the receiving of the paging message, the UE receives the paging message from the primary cell (PCell) based on an RRC idle mode. In order to receive the paging message, the UE in the RRC idle mode monitors a physical downlink control channel (PDCCH) of the primary cell (PCell) according to the DRX cycle.

According to an embodiment, the paging message may include information indicating at least one of the primary cell (PCell) or the secondary cell (SCell). Based on the paging message including the information representing the secondary cell (SCell), the UE may receive a physical downlink shared channel (PDSCH) from the secondary cell (SCell).

According to S1350 described above, an operation of the UE (reference numeral 100/200 in FIGS. 15 to 19) which receives, from the secondary cell (SCell), the synchronization signal (SS) based on the RRC reconfiguration message may be implemented by the devices in FIGS. 15 to 19. For example, referring to FIG. 16, one or more processors 102 may control one or more transceivers 106 and/or one or more memories 104 so as to receive the synchronization signal (SS) from the secondary cell (SCell) based on the RRC reconfiguration message.

In the method according to an embodiment of the present disclosure, since S1310 to S1330 are not particularly required components, S1310 to S1330 may be omitted in the method. Specifically, in the case of the UE which is not in the RRC connected state, the method may include S1310 to S1330. In the case of the UE which is in the RRC connected state, the method may include only S1340 and S1350.

Hereinafter, the embodiments will be described in terms of the operation of the BS.

FIG. 14 is a flowchart for describing a method of receiving, by a BS, system information in a wireless communication system supporting carrier aggregation according to an embodiment of the present disclosure.

Referring to FIG. 14, the method of transmitting, by the BS, system information in a wireless communication system supporting carrier aggregation according to an embodiment of the present disclosure may include an RRC configuration request message receiving step (S1410), an RRC configuration message transmitting step (S1420), an RRC configuration complete message receiving step (S1430), an RRC reconfiguration message transmitting step (S1440), and a synchronization signal transmitting step (S1450).

In S1410, the BS receives an RRC connection request message from the BS. The RRC connection request message may be Msg3 of a random access procedure.

According to S1410 described above, an operation of the (reference numeral 100/200 in FIGS. 15 to 19) which receives the RRC connection request message from the UE (reference numeral 100/200 in FIGS. 15 to 19) may be implemented by the devices in FIGS. 15 to 19. For example, referring to FIG. 16, one or more processors 202 may control one or more transceivers 206 and/or one or more memories 204 to receive the RRC connection request message from the UE 100.

In S1420, the BS transmits an RRC connection setup message to the UE. The RRC connection setup message may be Msg4 of the random access procedure.

According to S1420 described above, an operation of the BS (reference numeral 100/200 in FIGS. 15 to 19) which transmits the RRC connection setup message to the UE (reference numeral 100/200 in FIGS. 15 to 19) may be implemented by the devices in FIGS. 15 to 19. For example, referring to FIG. 16, one or more processors 202 may control one or more transceivers 206 and/or one or more memories 204 to transmit the RRC connection setup message to the UE 100.

In S1430, the BS receives the RRC connection setup complete message from the UE. The RRC connection setup complete message may be an RRC message (RRCSetupComplete message).

According to S1430 described above, an operation of the BS (reference numeral 100/200 in FIGS. 15 to 19) which receives the RRC connection setup complete message from the UE (reference numeral 100/200 in FIGS. 15 to 19) may be implemented by the devices in FIGS. 15 to 19. For example, referring to FIG. 16, one or more processors 202 may control one or more transceivers 206 and/or one or more memories 204 to receive the RRC connection setup complete message from the UE 100.

In S1440, the BS transmits, to the UE, the RRC reconfiguration message related to the configuration of the secondary cell (SCell) through the primary cell (PCell).

According to an embodiment, the secondary cell (SCell) may be a cell which operates in a specific frequency band. As an example, the specific frequency band may be a THz frequency band. A beam width of the secondary cell (SCell) based on the specific frequency band may be smaller than a beam width of the primary cell (PCell). One beamforming direction of the primary cell (PCell) may include a plurality of beamforming directions of the secondary cell (SCell) due to a difference of the beam width. In other words, a coverage region according to one primary cell (PCell) beam may include coverage regions according to a plurality of SCell beams.

According to S1440 described above, an operation of the BS (reference numeral 100/200 in FIGS. 15 to 19) which transmits, to the UE (reference numeral 100/200 in FIGS. 15 to 19), the RRC reconfiguration message related to the configuration of the secondary cell (SCell) through the primary cell (PCell) may be implemented by the devices in FIGS. 15 to 19. For example, referring to FIG. 16, one or more processors 202 may control one or more transceivers 206 and/or one or more memories 204 so as to transmit the RRC reconfiguration message related to the configuration of the secondary cell (SCell) through the primary cell (PCell).

In S1450, the BS transmits, to the UE, the synchronization signal (SS) based on the RRC reconfiguration message through the secondary cell (SCell).

According to an embodiment, the RRC reconfiguration message may include at least one of a master information block (MIB) of the secondary cell (SCell) or a time point when the synchronization signal is transmitted.

According to an embodiment, an SS block in which the synchronization signal is transmitted may be based on beam information of the primary cell (PCell) and the time point when the synchronization signal is transmitted.

According to an embodiment, the SS block may be one of a plurality of SS blocks based on the beam information of the primary cell (PCell). That is, the beamforming direction according to each SS block among the plurality of SS blocks is included in the beamforming direction based on the beam information of the primary cell (PCell). The beam information of the primary cell (PCell) may include at least one of a channel state information reference signal resource ID (CSI-RS resource ID), a precoding matrix index (PMI), or an SS block index (SSB index).

According to an embodiment, the time point when the synchronization signal is transmitted may be expressed as a specific bitmap. The specific bitmap may be a bitmap according to Method 1 or 2 described above. As an example, a number of bits of the specific bitmap may be based on a total number of slots included in a radio frame. As another example, the number of bits of the specific bitmap may be based on the number of slots in which the synchronization signal is transmitted in the radio frame.

According to an embodiment, the time point when the synchronization signal is transmitted may be expressed as an index representing a specific slot in the radio frame. The index may be an index according to Method 3 or 4 described above.

According to an embodiment, a number of bits of the index may be based on a number of the plurality of SS blocks.

As an example, the number of bits of the index may be x*ceil(log$_2$N$_{tot\_slot}$), and here, x may represent the number of the plurality of SS blocks, ceil( ) may represent an operator of performing a rounding operation of a decimal point or less, and N$_{tot\_slot}$ may represent the total number of slots in the radio frame.

As another example, the number of bits of the index may be x*ceil(log$_2$N$_{tot\_sync\_slot}$), and here, x may represent the number of the plurality of SS blocks, ceil( ) may represent an operator of performing a rounding operation of a decimal point or less, and N$_{tot\_sync\_slot}$ may represent the number of slots in which the synchronization signal is transmitted in the radio frame.

According to an embodiment, the RRC reconfiguration message may include a portion of the master information block (MIB).

That is, a portion of the master information block (MIB) may be included in the RRC reconfiguration message and a remainder of the master information block (MIB) is included in the synchronization signal. A portion of the master information block (MIB) may be information generated in the higher layer and the remainder of the master information block (MIB) may be information generated in the physical layer.

According to an embodiment, the synchronization signal may include a primary synchronization signal (PSS) and a secondary synchronization signal (SSS). In the case of the primary synchronization signal (PSS), a lot of operations are required for synchronization acquisition, so when complexity of UE implementation is considered, the remainder of the master information block (MIB) may be included in the secondary synchronization signal (SSS).

According to an embodiment, step S1450 above may further includes\transmitting a paging message. Specifically, in the transmitting of the paging message, the BS transmits the paging message to the UE which is in the RRC idle mode through the primary cell (PCell). That is, the BS transmits the paging message through a physical downlink control channel (PDCCH) according to the DRX cycle of the UE which is in the RRC idle mode.

According to an embodiment, the paging message may include information indicating at least one of the primary cell (PCell) or the secondary cell (SCell). Based on the paging message including the information representing the secondary cell (SCell), the BS may transmit a physical downlink shared channel (PDSCH) through the secondary cell (SCell).

According to S1450 described above, an operation of the BS (reference numeral 100/200 in FIGS. 15 to 19) which transmits, to the UE (reference numeral 100/200 in FIGS. 15 to 19), the synchronization signal (SS) based on the RRC reconfiguration message through the primary cell (PCell) may be implemented by the devices in FIGS. 15 to 19. For example, referring to FIG. 16, one or more processors 202 may control one or more transceivers 206 and/or one or more memories 204 so as to transmit, to the UE 100, the synchronization signal (SS) based on the RRC reconfiguration message through the secondary cell (SCell).

In the method according to another embodiment of the present disclosure, since S1410 to S1430 are not particularly required components, S1410 to S1430 may be omitted in the method. Specifically, in the case of the UE which is not in the RRC connected state, the method may include only S1410 and S1430. In the case of the UE which is in the RRC connected state, the method may include only S1440 and S1450.

Example of Wireless Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 15 illustrates a communication system 1 applied to the present disclosure.

Referring to FIG. 15, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

FIG. 16 illustrates wireless devices applicable to the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 17 illustrates a signal process circuit for a transmission signal.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a post-coding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 18 illustrates another example of a wireless device applied to the present disclosure.

The wireless device may be implemented in various forms according to a use-case/service (refer to FIG. 15). Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 19 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of the method of transmitting and receiving the system information in the wireless communication system supporting carrier aggregation, and the apparatus thereof according to an embodiment of the present disclosure are described below.

According to an embodiment of the present disclosure, a master information block (MIB) of a secondary cell (SCell) is included in an RRC reconfiguration message related to a configuration of the secondary cell (SCell) transmitted by a primary cell (PCell). Accordingly, system information (SI) of the secondary cell (SCell) is not transmitted through a physical broadcast channel (PBCH), so resource utilization is enhanced at the time of transmitting the system information. In particular, when the secondary cell (SCell) operates in a terahertz (THz) frequency band, the corresponding effect can be more prominent.

Furthermore, according to an embodiment of the present disclosure, an SS block in which a synchronization signal of the secondary cell (SCell) is transmitted can be based on a time point when beam information of the primary cell (PCell) and the synchronization signal of the secondary cell (SCell) are transmitted. Accordingly, even when the master information block (MIB) of the secondary cell (SCell) is not transmitted through the physical broadcast channel (PBCH), a beamforming direction of the secondary cell (SCell) can be effectively indicated.

Furthermore, according to an embodiment of the present disclosure, a UE in an RRC idle mode receives a paging message from the primary cell (PCell). The paging message includes information representing the secondary cell (SCell). Accordingly, resources and consumed power of the UE required for receiving paging information of the secondary cell (SCell) can be reduced.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of receiving, by a user equipment (UE), system information (SI) in a wireless communication system supporting carrier aggregation (CA), the method comprising:
   transmitting an RRC connection request message to a base station (BS);
   receiving an RRC connection setup message from the BS;
   transmitting an RRC connection setup complete message to the BS;
   receiving, from a primary cell (PCell) of the BS, an RRC reconfiguration message related to a configuration of a secondary cell (SCell); and
   receiving, from SCell of the BS, a synchronization signal (SS) based on the RRC reconfiguration message,
   wherein the RRC reconfiguration message includes at least one of a master information block (MIB) of the SCell or a time point when the synchronization signal is transmitted, and
   wherein an SS block related to the synchronization signal is transmitted based on beam information of the PCell and the time point when the synchronization signal is transmitted.

2. The method of claim 1, wherein the SS block is one of a plurality of SS blocks transmitted based on the beam information of the PCell, and
   wherein the beam information of the PCell includes at least one of a channel state information reference signal resource ID (CSI-RS resource ID), a precoding matrix index (PMI), or an SS block index (SSB index).

3. The method of claim 2, wherein a frequency band in which the SCell operates is different from a frequency band in which the PCell operates.

4. The method of claim 3, wherein a beam width of a signal transmitted from the SCell is smaller than a beam width of a signal transmitted from the PCell.

5. The method of claim 2, wherein the time point when the synchronization signal is transmitted is expressed as a bitmap.

6. The method of claim 5, wherein a number of bits of the bitmap is based on a total number of slots included in a radio frame.

7. The method of claim 2, wherein the time point when the synchronization signal is transmitted is expressed as an index representing a slot in the radio frame.

8. The method of claim 7, wherein a number of bits of the index is based on a number of the plurality of SS blocks.

9. The method of claim 8, wherein the number of bits of the index is $x*\mathrm{ceil}(\log_2 N_{tot\_sync\_slot})$,
   where x represents the number of the plurality of SS blocks, ceil( ) represents an operator of performing a rounding operation of a decimal point or less, and $N_{tot\_sync\_slot}$ represents the number of slots in which the synchronization signal is transmitted in the radio frame.

10. The method of claim 1, wherein a portion of the MIB is included in the RRC reconfiguration message and a remainder of the MIB is included in the synchronization signal.

11. The method of claim 10, wherein the synchronization signal includes a primary synchronization signal (PSS) and a secondary synchronization signal (SSS), and
the remainder of the master information block (MIB) is included in the secondary synchronization signal (SSS).

12. The method of claim 1, further comprising:
receiving a paging message from the PCell of the BS based on an RRC idle mode,
wherein the paging message includes information representing the SCell.

13. A UE receiving system information (SI) in a wireless communication system supporting carrier aggregation (CA), the UE comprising:
one or more transceivers;
one or more processors; and
one or more memories operatively connectable to the one or more processors, and storing instructions of performing operations when the reception of the system information is executed by the one or more processors,
wherein the operations include
transmitting an RRC connection request message to a base station (BS);
receiving an RRC connection setup message from the BS;
transmitting an RRC connection setup complete message to the BS;
receiving, from a primary cell (PCell) of the BS, an RRC reconfiguration message related to a configuration of a secondary cell (SCell); and
receiving, from the SCell of the BS, a synchronization signal (SS) based on the RRC reconfiguration message, and
wherein the RRC reconfiguration message includes at least one of a master information block (MIB) of the SCell or a time point when the synchronization signal is transmitted, and
wherein an SS block related to the synchronization signal is transmitted based on beam information of the PCell and the time point when the synchronization signal is transmitted.

14. A method of transmitting, by a base station (BS), system information (SI) in a wireless communication system supporting carrier aggregation (CA), the method comprising:
receiving an RRC connection request message from a user equipment (UE);
transmitting an RRC connection setup message to the UE;
receiving an RRC connection setup complete message from the UE;
transmitting, to the UE, an RRC reconfiguration message related to a configuration of a secondary cell (SCell) through a primary cell (PCell); and
transmitting, to the UE, a synchronization signal (SS) based on the RRC reconfiguration message through the SCell, and
wherein the RRC reconfiguration message includes at least one of a master information block (MIB) of the SCell or a time point when the synchronization signal is transmitted, and
wherein an SS block related to the synchronization signal is transmitted based on beam information of the PCell and the time point when the synchronization signal is transmitted.

* * * * *